United States Patent
Kashiwagi

(10) Patent No.: US 8,129,869 B2
(45) Date of Patent: Mar. 6, 2012

(54) ELECTRET AND ELECTROSTATIC INDUCTION CONVERSION DEVICE

(75) Inventor: Kimiaki Kashiwagi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/049,833

(22) Filed: Mar. 16, 2011

(65) Prior Publication Data

US 2011/0166299 A1    Jul. 7, 2011

Related U.S. Application Data

(63) Continuation of application No. PCT/JP2009/066181, filed on Sep. 16, 2009.

(30) Foreign Application Priority Data

Sep. 19, 2008    (JP) .................................. 2008-241074

(51) Int. Cl.
*G11C 13/02*    (2006.01)

(52) U.S. Cl. ..... 307/400; 204/165; 204/169; 525/326.2; 525/326.3

(58) Field of Classification Search .................. 307/400; 204/165, 169; 525/326.2, 326.3
See application file for complete search history.

(56) References Cited

U.S. PATENT DOCUMENTS

| | | | |
|---|---|---|---|
| 3,702,493 A | 11/1972 | Murphy | |
| 3,946,422 A | 3/1976 | Yagi et al. | |
| 4,250,415 A | 2/1981 | Lewiner et al. | |
| 4,291,245 A | 9/1981 | Nowlin et al. | |
| 4,441,038 A | 4/1984 | Tanaka et al. | |
| 4,442,324 A | 4/1984 | Blanchard et al. | |
| 4,443,711 A | 4/1984 | Tanaka et al. | |
| 4,513,049 A | 4/1985 | Yamasaki et al. | |
| 5,161,233 A | 11/1992 | Matsuo et al. | |
| 5,256,176 A * | 10/1993 | Matsuura et al. | ................ 55/528 |
| 5,267,076 A | 11/1993 | Broussoux et al. | |
| 5,284,693 A | 2/1994 | Spain et al. | |
| 5,439,768 A | 8/1995 | Matsuo et al. | |
| 5,558,809 A | 9/1996 | Groh et al. | |
| 5,610,455 A | 3/1997 | Allen et al. | |
| 5,638,103 A | 6/1997 | Obata et al. | |
| 5,731,116 A | 3/1998 | Matsuo et al. | |

(Continued)

FOREIGN PATENT DOCUMENTS

EP    0 369 032 A1    5/1990

(Continued)

OTHER PUBLICATIONS

U.S. Appl. No. 12/890,441, filed Sep. 24, 2010, Kashiwagi et al.

(Continued)

*Primary Examiner* — Bernard Lipman
(74) *Attorney, Agent, or Firm* — Foley & Lardner LLP

(57) ABSTRACT

To provide an electret having high stability with time and thermal stability of retained electric charge and having excellent charge retention performance, and an electrostatic induction conversion device comprising such an electret. This has been done by providing an electret obtained from a composition comprising a compound (A) having a molecular weight of from 50 to 2000 and having at least two polar functional groups, and a polymer (B) having a number average molecular weight of more than 2000 and having reactive functional groups reactive with the above polar functional groups and an electrostatic induction conversion device comprising such an electret.

13 Claims, 2 Drawing Sheets

U.S. PATENT DOCUMENTS

| | | | |
|---|---|---|---|
| 5,759,205 A | 6/1998 | Valentini | |
| 5,787,327 A | 7/1998 | Matsushita et al. | |
| 5,981,123 A | 11/1999 | Matsuo et al. | |
| 6,489,033 B1 | 12/2002 | Hatke et al. | |
| 6,493,013 B2 | 12/2002 | Obata et al. | |
| 6,573,205 B1* | 6/2003 | Myers et al. | 442/414 |
| 6,806,593 B2 | 10/2004 | Tai et al. | |
| 6,870,939 B2 | 3/2005 | Chiang et al. | |
| 6,893,990 B2* | 5/2005 | Myers et al. | 442/414 |
| 7,449,811 B2 | 11/2008 | Suzuki et al. | |
| 7,879,446 B2 | 2/2011 | Liu et al. | |
| 2002/0080684 A1 | 6/2002 | Donskoy et al. | |
| 2005/0009944 A1 | 1/2005 | Apostolo et al. | |
| 2005/0107555 A1 | 5/2005 | Chiang et al. | |
| 2006/0113862 A1 | 6/2006 | Suzuki et al. | |
| 2008/0111444 A1 | 5/2008 | Mabuchi | |
| 2008/0122313 A1 | 5/2008 | Mabuchi et al. | |
| 2009/0051242 A1 | 2/2009 | Suzuki et al. | |
| 2009/0245547 A1* | 10/2009 | Lee et al. | 381/191 |
| 2010/0127595 A1 | 5/2010 | Suzuki et al. | |
| 2011/0012438 A1 | 1/2011 | Kashiwagi et al. | |

FOREIGN PATENT DOCUMENTS

| | | |
|---|---|---|
| EP | 0 460 523 A1 | 12/1991 |
| EP | 0 950 672 A1 | 10/1999 |
| EP | 0 969 023 A2 | 1/2000 |
| EP | 2 266 792 A1 | 12/2010 |
| GB | 2 079 056 A | 1/1982 |
| JP | 64-041865 A | 2/1989 |
| JP | 01-112468 U | 7/1989 |
| JP | 03-156375 A | 7/1991 |
| JP | 04-255716 A | 9/1992 |
| JP | 08-015302 A | 1/1996 |
| JP | 08-041260 A | 2/1996 |
| JP | 08155230 * | 6/1996 |
| JP | 2002-505034 A | 2/2002 |
| JP | 2003-013359 A | 1/2003 |
| JP | 2004-059763 A | 2/2004 |
| JP | 2004-128361 A | 4/2004 |
| JP | 2006-180450 A | 7/2006 |
| JP | 2006-253847 A | 9/2006 |
| JP | 2006-329800 A | 12/2006 |
| JP | 2007-292743 A | 11/2007 |
| JP | 2007-312551 A | 11/2007 |
| JP | 2007-333618 A | 12/2007 |
| JP | 2008-010176 A | 1/2008 |
| JP | 2008-016919 A | 1/2008 |
| JP | 2008-028499 A | 2/2008 |
| JP | 2008-167231 A | 7/2008 |
| JP | 2008-266563 A | 11/2008 |
| JP | 2009-017769 A | 1/2009 |
| WO | WO-98/56836 A1 | 12/1998 |
| WO | WO-2007/044921 A1 | 4/2007 |
| WO | WO-2008/114489 A1 | 9/2008 |
| WO | WO-2008/133088 A1 | 11/2008 |

OTHER PUBLICATIONS

U.S. Appl. No. 12/894,097, filed Sep. 29, 2010, Hamatani et al.
U.S. Appl. No. 12/805,234, filed Jul. 20, 2010, Kashiwagi.
U.S. Appl. No. 12/904,856, filed Oct. 14, 2010, Kashiwagi et al.
International Search Report in PCT/JP2009/066181, 2009.
International Preliminary Report on Patentability and Written Opinion in PCT/JP2009/066181, 2009.
Arakawa et al., "Micro Seismic Power Generator Using Electret Polymer Film," The 9th National Symposium on Power and Energy Systems (SPES 2004), Jun. 22, 2004, pp. 37-38.
Chapter 3 "Vision for the future of the ubiquitous sensor network" in "The final report for a realization of the ubiquitous sensor network", Ministry of Internal Affairs and Communications, Sep. 2004, Internet: http://www.soumu.go.jp/s-news/2004/040806__4_b2.html, accessed on Mar. 6, 2008.
International Search Report in PCT/JP2009/055979, 2009.
International Search Report in PCT/JP2009/057656, 2009.
International Search Report in PCT/JP2009/052932, 2009.
International Search Report in PCT/JP2009/056175, 2009.
Supplementary European Search Report dated Aug. 2, 2011 in EP 09711771.7.
Supplementary European Search Report dated Jul. 27, 2011, in EP 09724065.9.
Supplementary European Search Report dated Jul. 28, 2011, in EP 09732621.9.

* cited by examiner

ELECTRET AND ELECTROSTATIC INDUCTION CONVERSION DEVICE

TECHNICAL FIELD

The present invention relates to an electret and an electrostatic induction conversion device comprising such an electret.

BACKGROUND ART

Heretofore, an electrostatic induction conversion device such as a power-generating unit or a microphone has been proposed wherein an electret having an electric charge injected to an insulating material, is used.

As the material for such an electret, it has been common to use a linear fluororesin such as polytetrafluoroethylene. Further, recently, it has been proposed to use a polymer having a fluoroalicyclic structure in its main chain (e.g. Patent Document 1), as the material for such an electret.

PRIOR ART DOCUMENT

Patent Document
  Patent Document 1: JP-A-2006-180450

DISCLOSURE OF INVENTION

Technical Problem

However, a conventional electret has a problem such that the electric charge injected is hardly retained stably, and therefore the electric charge is readily emitted with time or at high temperature. Such a problem tends to cause reduction of the surface voltage of the electret, thus leading to the deterioration of e.g. electrostatic induction performance of an electrostatic induction conversion device using the electret. Therefore, it has been required to improve the charge retention performance, especially stability with time and thermal stability, for stably retaining electric charge injected.

The present invention has been made in view of such a problem, and it is an object of the present invention to provide an electret having high stability with time and high thermal stability of retained electric charge and having excellent charge retention performance, and an electrostatic induction conversion device comprising such an electret.

Solution to Problem

A first embodiment of the present invention to accomplish the above object is an electret obtained from a composition comprising a compound (A) having a molecular weight of from 100 to 2000 and having at least two polar functional groups, and a polymer (B) having a number average molecular weight of more than 2000 and having reactive functional groups reactive with the above polar functional groups.

A second embodiment of the present invention is an electrostatic induction conversion device comprising the electret of the first embodiment.

Advantageous Effects of the Invention

According to the present invention, it is possible to provide an electret having high stability with time and high thermal stability of retained electric charge and having excellent charge retention performance, and an electrostatic induction conversion device comprising such an electret.

DESCRIPTION OF EMBODIMENT

Figure 1:
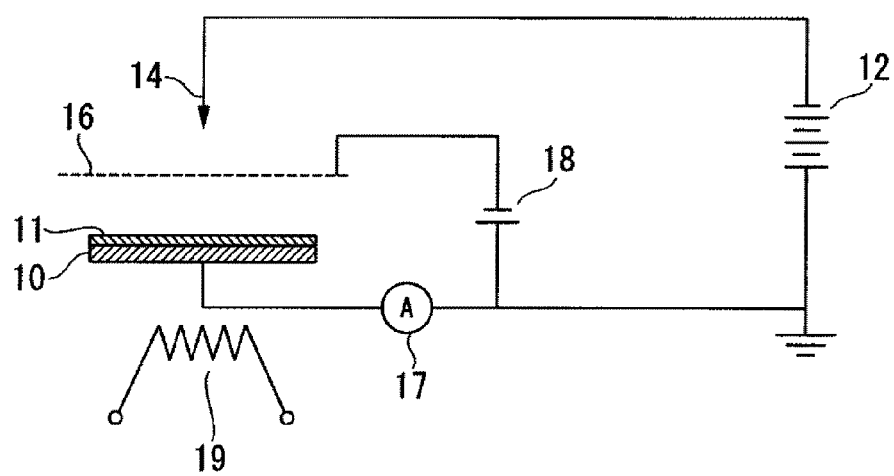
FIG. 1 is a schematic diagram illustrating a corona charging equipment used for injection of electric charge.

Now, the present invention will be described in further detail.

In this specification, repeating units constituting a polymer may be referred to simply as "units".

Further, a unit represented by the formula (a1) may be referred to also as "a unit (a1)". A unit, compound or the like represented by another formula will be referred to in a similar manner, and for example, a compound represented by the formula (1) may be referred to also as "a compound (1)".

<Electret>

The electret of the present invention is obtained from a composition comprising a compound (A) having a molecular weight of from 50 to 2000 and having at least two polar functional groups, and a polymer (B) having a number average molecular weight of more than 2000 and having reactive functional groups reactive with the above polar functional groups.

[Compound (A)]

The compound (A) has at least two polar functional groups.

In this specification and claims, a "polar functional group" is a functional group having either one or both of the following properties (1a) and (1b):

(1a) a functional group containing at least two atoms differing in the electronegativity and having polarity due to polarization in the functional group.

(1b) a functional group in which polarization occurs due to the difference in electronegativity between the functional group and carbon bonded thereto.

As a specific example of the polar functional group having only the above property (1a), a hydroxyphenyl group may be mentioned.

As a specific example of the polar functional group having only the above property (1b), a primary amino group ($-NH_2$), a secondary amino group ($-NH-$), a hydroxy group or a thiol group may be mentioned.

As a specific example of the polar functional group having both of the above properties (1a) and (1b), a sulfonic group, a phosphono group, a carboxy group, an alkoxycarbonyl group, an acid halide group, a formyl group, an isocyanate group, a cyano group, a carbonyloxy group ($-C(O)-O-$) or a carbonate group ($-O-C(O)-O-$) may be mentioned.

The number of carbon atoms of an alkyl group in the above alkoxycarbonyl group is preferably from 1 to 10, more preferably from 1 to 5.

The above acid halide group may, for example, be a carboxylic acid halide group ($-C(O)X$ [X is a halogen atom], a sulfonic acid halide group ($-S(O)_2X$ [X is a halogen atom]), a sulfonic acid halide group ($-S(O)X$ [X is a halogen atom]), or a phosphoric acid halide group ($-P(O)X$ [X is a halogen atom]). The halogen atom (the above X) in the acid halide group may be a chlorine atom, a fluorine atom, a bromine atom or an iodine atom.

In the present invention, the compound (A) preferably has, as the polar functional groups, a monovalent polar functional group selected from the group consisting of a primary amino group, a hydroxy group, a thiol group, a sulfonic group, a phosphono group, a carboxy group, an alkoxycarbonyl group, an acid halide group, a formyl group, a hydroxyphenyl group, an isocyanate group and a cyano group, and/or a bivalent polar functional group selected from the group consisting of a secondary amino group, a carbonyloxy group and a carbonate group, from the viewpoint of compatibility with the polymer (B).

In the present invention, the polar functional group is preferably at least one member selected from the group consisting of a primary amino group, a hydroxy group, a thiol group, a hydroxyphenyl group and a secondary amino group, or at least one member selected from the group consisting of a sulfonic group, a phosphono group, a carboxy group, an alkoxycarbonyl group, an acid halide group, a formyl group, a hydroxyphenyl group, an isocyanate group, a cyano group, a carbonyloxy group and a carbonate group, by taking into consideration the combination with a reactive functional group reactive with the polar functional group to be introduced into the polymer (B).

Among them, the above polar functional group is preferably at least one member selected from the group consisting of a primary amino group, a hydroxy group, a thiol group, a hydroxyphenyl group and a secondary amino group, particularly preferably a primary amino group and/or a secondary amino group, from the viewpoint of e.g. strength of polarity, and easiness of introduction of the reactive functional group reactive with the polar functional group into the polymer (B).

The molecular weight of the compound (A) is from 50 to 2,000, preferably from 100 to 2,000. If the molecular weight of the compound (A) is less than 50, it easily volatilizes due to such a low molecular weight, whereby it becomes difficult that the compound (A) remains in the polymer (B) after a film is formed. Further, if the molecular weight of the compound (A) exceeds 2,000, the layer separation from the polymer (B) easily occurs, and the compatibility tends to be problematic.

As the compound (A), e.g. the following compounds (A-1) to (A-3) may specifically be mentioned. The compound (A-1) is a compound having two polar functional groups, and the compounds (A-2) to (A-3) are respectively compounds having at least three polar functional groups.

(A-1)

wherein each of $P^1$ and $P^2$ which are independent of each other, is a monovalent polar functional group, and $R^{15}$ is a bivalent organic group.

(A-2)

wherein $P^3$ is a monovalent polar functional group, $R^{16}$ is a bivalent organic group, Q is a n-valent linking group, and n is an integer of at least 3.

(A-3)

wherein each of $P^4$ and $P^5$ which are independent of each other, is a monovalent polar functional group, $P^6$ is a bivalent polar functional group, each of $R^{17}$ and $R^{18}$ which are independent of each other, is a bivalent organic group, and m is an integer of at least 1.

In the formula (A-1), the monovalent polar functional group for each of $P^1$ and $P^2$ may be the same one as the monovalent polar functional group mentioned in explanation for the above polar functional group.

$P^1$ and $P^2$ may, respectively, be the same or different.

The bivalent organic group for $R^{15}$ is preferably a bivalent hydrocarbon group which may contain a hetero atom, and the bivalent hydrocarbon group may, for example, be a linear, branched or cyclic alkylene group, or a bivalent aromatic group.

The number of carbon atoms of the linear alkylene group is preferably from 2 to 10, more preferably from 2 to 8.

The number of carbon atoms of the branched alkylene group is preferably from 3 to 10, more preferably from 3 to 8.

The number of carbon atoms of the cyclic alkylene group is preferably from 3 to 8, more preferably 5 or 6.

In the linear, branched or cyclic alkylene group, some or all of hydrogen atoms may be substituted by a halogen atom. The halogen atom is preferably a fluorine atom or a chlorine atom.

Further, the linear, branched or cyclic alkylene group may contain an etheric oxygen atom (—O—) or a thioetheric sulfur atom (—S—) in its structure.

The bivalent aromatic group is preferably a group containing at least one arylene group. When the aromatic group contains at least two arylene groups, these arylene groups may be bonded directly or via a linking group. The linking group may, for example, be the above alkylene group.

The number of arylene groups contained in the aromatic group is preferably from 1 to 10.

The arylene group is preferably a phenylene group.

Specific examples of the compound (A-1) include a diamine such as ethane-1,2-diamine, propane-1,3-diamine, butane-1,4-diamine, pentane-1,5-diamine, hexane-1,6-diamine, heptane-1,7-diamine, octane-1,8-diamine, 3-methylpentane-1,5-diamine, 3,3'-dimethylpentane-1,5-diamine, 3-methylhexane-1,6-diamine, 3,3'-dimethylhexane-1,6-diamine, 3-(3-aminopropoxy)propane-1-amine, 3-(2-aminoethoxy)propane-1-amine, 4-(aminomethoxy)butane-1-amine, cyclopentane-1,2-diamine, cyclopentane-1,3-diamine, cyclonexane-1,2-diamine, cyclohexane-1,3-diamine, cyclohexane-1,4-diamine, 1,2-diaminobenzene, 1,3-diaminobenzene, 1,4-diaminobenzene, 2,4-diaminotoluene, 4,4'-diaminobiphenyl, 4,4'-diamino-diphenylmethane, 3,3,4,4-tetrafluorohexane-1,6-diamine, 2,2,3,3,4,4,5,5-octafluorohexane-1,6-diamine, 3,3,4,4,5,5,6,6-octafluorooctane-1,8-diamine and 2,2,3,3,4,4,5,5,6,6,7,7-dodecafluorooctane-1,8-diamine;

a diol such as ethylene glycol, propylene glycol, butane-1,4-diol, pentane-1,5-diol, hexane-1,6-diol, heptane-1,7-diol, octane-1,8-diol, 3-methylpentane-1,5-diol, 3,3'-dimethylpentane-1,5-diol, 3-methylhexane-1,6-diol, 3,3'-dimethylhexane-1,6-diol, diethylene glycol, dipropylene glycol, cyclopentane-1,2-diol, cyclopentane-1,3-diol, cyclohexane-1,2-diol, cyclohexane-1,3-diol, cyclohexane-1,4-diol, 2-hydroxyphenol, 3-hydroxyphenol, 4-hydroxyphenol, 2,4-dihydroxytoluene, 4,4'-dihydroxybiphenyl, 4,4'-dihydroxydiphenylmethane, 3,3,4,4-tetrafluorohexane-1,6-diol, 2,2,3,3,4,4,5,5-octafluorohexane-1,6-diol, 3,3,4,4,5,5,6,6-octafluorooctane-1,8-diol and 2,2,3,3,4,4,5,5,6,6,7,7-dodecafluorooctane-1,8-diol;

a dithiol such as ethane-1,2-dithiol, propane-1,3-dithiol, butane-1,4-dithiol, pentane-1,5-dithiol, hexane-1,6-dithiol, heptane-1,7-dithiol, octane-1,8-dithiol, 3-methylpentane-1,5-dithiol, 3,3'-dimethylpentane-1,5-dithiol, 3-methylhexane-1,6-dithiol, 3,3'-dimethylhexane-1,6-dithiol, 3-(3-mercaptopropoxy)propane-1-thiol, 3-(2-mercaptoethoxy)propane-1-thiol, 4-(mercaptomethoxy)butane-1-thiol, cyclopentane-1,2-dithiol, cyclopentane-1,3-dithiol, cyclohexane-1,2-dithiol, cyclohexane-1,3-dithiol, cyclohexane-1,4-dithiol, 2-mercaptothiophenol, 3-mercaptothiophenol, 4-mercaptothiophenol, 2,4-dimercaptotoluene, 4,4'-dimercaptobiphenyl, 4,4'-dimercapto-diphenylmethane, 3,3,4,4-tetrafluorohexane-1,6-dithiol, octafluorohexane-1,6-dithiol, 3,3,4,4,5,5,6,6-octafluorooctane-1,8-dithiol and 2,2,3,3,4,4,5,5,6,6,7,7-dodecafluorooctane-1,8-dithiol;

an amino alcohol such as 2-aminoethanol, 3-aminopropanol, 4-aminobutanol, 5-aminopentanol, 6-aminohexanol, 7-aminoheptanol, 8-aminooctanol, 3-methyl-5-amino-pentan-1-ol, 3,3'-dimethyl-5-amino-pentan-1-ol, 3-methyl-6-amino-hexan-1-ol, 3,3'-dimethyl-6-amino-hexan-1-ol, 2-(2-aminoethoxy)ethanol, 3-(3-aminopropoxy)propanol, 2-aminocyclopentan-1-ol, 3-aminocyclopetan-1-ol, 2-aminocyclohexan-1-ol, 3-aminocyclohexan-1-ol, 4-aminocyclohexan-1-ol, 2-aminophenol, 3-aminophenol, 4-aminophenol, 2-amino-4-hydroxytoluene, 4-amnio-4'-hydroxybiphenyl, 4-amino-4'-hydroxy-diphenylmethane, 6-amino-3,3,4,4-tetrafluorohexan-1-ol, 6-amino-2,2,3,3,4,4,5,5-octafluorohexan-1-ol, 8-amnio-3,3,4,4,5,5,6,6-octafluorooctan-1-ol and 8-amino-2,2,3,3,4,4,5,5,6,6,7,7-dodecafluorooctan-1-ol;

an aminothiol such as 2-aminoethanethiol, 3-aminopropanethiol, 4-aminobutanethiol, 5-aminopentanethiol, 6-aminohexanethiol, 7-aminoheptanethiol, 8-aminooctanethiol, 3-methyl-5-amino-pentane-1-thiol, 3,3'-dimethyl-5-aminopentane-1-thiol, 3-methyl-6-amino-hexane-1-thiol, 3,3'-dimethyl-6-amino-hexane-1-thiol, 2-(2-aminoethoxy) ethanethiol, 3-(3-aminopropoxy)propanethiol, 2-aminocyclopentane-1-thiol, 3-aminocyclopentane-1-thiol, 2-aminocyclohexane-1-thiol, 3-aminocyclohexane-1-thiol, 4-aminocyclohexane-1-thiol, 2-aminothiophenol, 3-aminothiophenol, 4-aminothiophenol, 2-amino-4-mercaptotoluene, 4-amino-4'-mercaptobiphenyl, 4-amino-4'-mercaptodiphenylmethane, 6-amino-3,3,4,4,-tetrafluorohexane-1-thiol, 6-amino-2,2,3,3,4,4,5,5-octafluorohexane-1-thiol, 8-amino-3,3,4,4,5,5,6,6-octafluorooctane-1-thiol and 8-amino-2,2,3,3,4,4,5,5,6,6,7,7-dodecafluorooctane-1-thiol; and a mercaptoalcohol such as 2-mercaptoethanol, 3-mercaptopropanol, 4-mercaptobutanol, 5-mercaptopentanol, 6-mercaptohexanol, 7-mercaptoheptanol, 8-mercaptooctanol, 3-methyl-5-mercapto-pentan-1-ol, 3,3'-dimethyl-5-mercapto-pentan-1-ol, 3-methyl-6-mercapto-hexan-1-ol, 3,3'-dimethyl-6-mercapto-hexan-1-ol, 2-(2-mercaptoethoxy) ethanol, 3-(3-mercaptopropoxy)propanol, 2-mercaptocyclopentan-1-ol, 3-mercaptocyclopentan-1-ol, 2-mercaptocyclohexan-1-ol, 3-mercaptocyclohexan-1-ol, 4-mercaptocyclohexan-1-ol, 2-mercaptophenol, 3-mercaptophenol, 4-mercaptophenol, 2-mercapto-4-hydroxytoluene, 4-mercapto-4'-hydroxybiphenyl, 4-mercapto-4'-hydroxydiphenylmethane, 3,3,4,4-tetrafluoro-6-mercapto-hexan-1-ol, 2,2,3,3,4,4,5,5-octafluoro-6-mercapto-hexan-1-ol, 3,3,4,4,5,5,6,6-octafluoro-8-mercapto-octan-1-ol and 2,2,3,3,4,4,5,5,6,6,7,7-dodecafluoro-8-mercapto-octan-1-ol.

As the compound (A-1), it is especially preferred to use a diamine among the above-mentioned compounds, and among them, it is preferred to use pentane-1,5-diamine, hexane-1,6-diamine, heptane-1,7-diamine, octane-1,8-diamine, cyclohexane-1,2-diamine, cyclohexane-1,3-diamine, cyclohexane-1,4-diamine, 3,3,4,4,-tetrafluorohexane-1,6-diamine, 2,2,3,3,4,4,5,5-octafluorohexane-1,6-diamine, 3,3,4,4,5,5,6,6-octafluorooctane-1,8-diamine or 2,2,3,3,4,4,5,5,6,6,7,7-dodecafluorooctane-1,8-diamine, and it is particularly preferred to use hexane-1,6-diamine or cyclohexane-1,3-diamine, from the viewpoints of compatibility with the polymer (B) and volatility in a case where the compound (A-1) is formed into a coating composition.

In the formula (A-2), $P^3$ may be the same one as the above $P^1$. The "n" pieces of $P^3$ in the formula may respectively be the same or different.

$R^{16}$ may be the same one as the above $R^{15}$. The "n" pieces of $R^{16}$ in the formula may respectively be the same or different.

The n-valent linking group as Q may, for example, be a n-valent hetero atom or an n-valent organic group.

The n-valent hetero atom may, for example, be a nitrogen atom or a phosphorus atom when n=3.

The n-valent organic group may, for example, be a carbon atom or a n-valent hydrocarbon group which may contain a hetero atom. The n-valent hydrocarbon group may, for example, be a group having "n" pieces of hydrogen atoms removed from a linear, branched or cyclic alkane, or a n-valent aromatic group.

The group having "n" pieces of hydrogen atoms removed from the alkane may, for example, be a group having "(n-2)" pieces of hydrogen atoms further removed from the alkylene group mentioned for the above $R^{15}$, or a branched group having "n" pieces of branches.

In the group having "n" pieces of hydrogen atoms removed from the alkane, some or all of the hydrogen atoms may be substituted by halogen atoms. Such a halogen atom is preferably a fluorine atom or a chlorine atom.

Further, the group having "n" pieces of hydrogen atoms removed from the alkane may contain an etheric oxygen atom (—O—), a thioetheric sulfur atom (—S—) or the above n-valent hetero atom in its structure.

The n-valent aromatic group may be a group having ("n-2") pieces of hydrogen atoms further removed from the aromatic group mentioned for the above $R^{15}$.

n is an integer of at least 3. The upper limit of n may be such that the molecular weight of the compound becomes at most 2,000. n is especially preferably from 3 to 6, more preferably 3 or 4.

Specific examples of the compound (A-2) include a compound having at least 3 primary amino groups, such as triaminomethylamine, tris(2-aminoethyl)amine, tris(3-aminopropyl)amine, tris(4-aminobutyl)amine, 2-(aminomethyl)propane-1,3-diamine, 3-(2-aminoethyl)pentane-1,5-diamine, triaminomethylphosphine, tris(2-aminoethyl) phosphine, tris(3-aminopropyl)phosphine, tris(4-aminobutyl)phosphine, 2,2'-bis(aminomethyl)propane-1,3-diamine, 2,2'-oxybis(methylene)bis(2-(aminomethyl) propane-1,3-diamine), cyclohexane-1,3,5-triamine, cyclohexane-1,2,4-triamine, 1,3,5-triaminobenzene, 1,2,4-triaminobenzene, 2,4,6-triaminotoluene, 1,3,5-tris(aminomethyl)benzene, 1,2,4-tris(aminomethyl)benzene, 2,4,6-tris(aminomethyl)toluene, 1,3,5-tris(2-aminoethyl)benzene, 1,2,4-tris(2-aminoethyl)benzene and 2,4,6-tris(2-aminoethyl)toluene;

a compound having at least 3 hydroxy groups, such as trihydroxymethylamine, tris(2-hydroxyethyl)amine, tris(3-hydroxypropyl)amine, tris(4-hydroxybutyl)amine, 2-(hydroxymethyl)propane-1,3-diol, 3-(2-hydroxyethyl)pentane-1,5-diol, trihydroxymethylphosphine, tris(2-hydroxyethyl) phosphine, tris(3-hydroxypropyl)phosphine, tris(4-hydroxybutyl)phosphine, 2,2'-bis(hydroxymethyl)propane-1,3-diol (trivial name: pentaerythritol), 2,2'-oxybis (methylene)bis(2-(hydroxymethyl)propane-1,3-diol) (trivial name: dipentaerythritol), 1,3,5-trihydroxycyclohexane, 1,2,4-trihydroxycyclohexane, 3,5-dihydroxyphenol, 2,4-dihydroxyphenol, 2,4,6-trihydroxytoluene, 1,3,5-tris(hydroxymethyl)benzene, 1,2,4-tris(hydroxymethyl)benzene, 2,4,6-tris(hydroxymethyl)toluene, 1,3,5-tris(2-hydroxyethyl)benzene, 1,2,4-tris(2-hydroxyethyl)benzene and 2,4,6-tris(2-hydroxyethyl)toluene;

a compound having at least 3 mercapto groups, such as tris(2-mercaptoethyl)amine, tris(3-mercaptopropyl)amine, tris(4-mercaptobutyl)amine, 2-(mercaptomethyl)propane-1,3-dithiol, 3-(2-mercaptoethyl)pentane-1,5-dithiol, trimercaptomethylphosphine, tris(2-mercaptoethyl)phosphine, tris(3-mercaptopropyl)phosphine, tris(4-mercaptobutyl)phosphine, 2,2'-bis(mercaptomethyl)propane-1,3-dithiol, 2,2'-oxybis(methylene)bis(2-(mercaptomethyl)propane-1,3-dithiol, 1,3,5-trimercaptocyclohexane, 1,2,4-trimercaptocyclohexane, 3,5-dimercaptothiophenol, 2,4-dimercaptothiophenol, 2,4,6-trimercaptotoluene, 1,3,5-tris(mercaptomethyl)benzene, 1,2,4-tris(mercaptomethyl)benzene, 2,4,6-tris(mercaptomethyl)toluene, 1,3,5-tris(2-mercaptoethyl)benzene, 1,2,4-tris(2-mercaptoethyl)benzene and 2,4,6-tris(2-mercaptoethyl)toluene;

a compound having one primary amino group and two hydroxy groups, such as 1-(bis(hydroxymethyl)amino)methylamine, 2-(bis(2-hydroxyethyl)amino)ethylamine, 3-(bis(3-hydroxypropyl)amino)propylamine, 4-(bis(4-hydroxybutyl)amino)butylamine, 3-(2-aminoethyl)pentane-1,5-diol, 1-(bis(hydroxymethyl)phosphino)methylamine, 2-(bis(2-hydroxyethyl)phosphino)ethylamine, 3-(bis(3-hydroxypropyl)phosphino)propylamine, 4-(bis(4-hydroxybutyl)phosphino)butylamine, 3-amino-5-hydroxycyclohexanol, 2-amino-4-hydroxycyclohexanol, 3-amino-5-hydroxyphenol, 2-amino-4-hydroxyphenol and 2-amino-4,6-dihydroxytoluene;

a compound having one primary amino group and two mercapto groups, such as 1-(bis(mercaptomethyl)amino)methylamine, 2-(bis(2-mercaptoethyl)amino)ethylamine, 3-(bis(3-mercaptopropyl)amino)propylamine, 4-(bis(4-mercaptobutyl)amino)butylamine, 3-(2-aminoethyl)pentane-1,5-dithiol, 1-(bis(mercaptomethyl)phosphino)methylamine, 2-(bis(2-mercaptoethyl)phosphino)ethylamine, 3-bis(3-mercaptopropyl)phosphino)propylamine, 4-(bis(4-mercaptobutyl)phosphino)butylamine, 3-amino-5-mercaptocyclohexanethiol, 2-amino-4-mercaptohexanethiol, 3-amino-5-mercaptothiophenol, 2-amino-4-mercaptothiophenol and 2-amino-4,6-dimercaptotoluene;

a compound having two primary amino groups and one or two of hydroxy groups, such as 1-(bis(aminomethyl)amino)methanol, 2-(bis(2-aminoethyl)amino)ethanol, 3-(bis(3-aminopropyl)amino)propanol, 4-(bis(4-aminobutyl)amino)butanol, 3-amino-2-(aminomethyl)propan-1-ol, 5-amino-3-(2-aminoethyl)pentan-1-ol, 2-(aminomethyl)propane-1,3-diol, 1-(bis(aminomethyl)phosphino)methanol, 2-(bis(2-aminoethyl)phosphino)ethanol, 3-(bis(3-aminopropyl)phosphino)propanol, 4-(bis(4-aminobutyl)phosphino)butanol, 2,2'-bis(aminomethyl)propane-1,3-diol, 2,2'-oxybis(methylene)bis(2-(aminomethyl)propane-1,3-diol), 3,5-diamino-cyclohexanol, 2,4-diamino-cyclohexanol, 3,5-diaminophenol, 2,4-diaminophenol and 2,4-diamino-6-hydroxytoluene;

a compound having two primary amino groups and one or two of mercapto groups, such as 1-(bis(aminomethyl)amino)methanethiol, 2-(bis(2-aminoethyl)amino)ethanethiol, 3-(bis(3-aminopropyl)amino)propanethiol, 4-(bis(4-aminobutyl)amino)butanethiol, amino-2-(aminomethyl)propane-1-thiol, 5-amino-3-(2-aminoethyl)pentane-1-thiol, 1-(bis(aminomethyl)phosphino)methanethiol, 2-(bis(2-aminoethyl)phosphino)ethanethiol, 3-(bis(3-aminopropyl)phosphino)propanethiol, 4-(bis(4-aminobutyl)phosphino)butanethiol, 2,2'-bis(aminomethyl)propane-1,3-dithiol, 2,2'-oxybis(methylene)bis(2-(aminomethyl)propane-1,3-dithiol), 3,5-diamino-cyclohexanethiol, 2,4-diamino-cyclohexanethiol, 3,5-diaminothiophenol, 2,4-diaminothiophenol and 2,4-diamino-6-mercaptotoluene; and a compound having two mercapto groups and one or two of hydroxy groups, such as 1-(bis(mercaptomethyl)amino)methanol, 2-(bis(2-mercaptoethyl)amino)ethanol, 3-(bis(3-mercaptopropyl)amino)propanol, 4-(bis(4-mercaptobutyl)amino)butanol, 3-mercapto-2-(mercaptomethyl)propan-1-ol, 5-mercapto-3-(2-mercaptoethyl)pentan-1-ol, 1-(bis(mercaptomethyl)phosphino)methanol, 2-(bis(2-mercaptoethyl)phosphino)ethanol, 3-(bis(3-mercaptopropyl)phosphino)propanol, 4-(bis(4-mercaptobutyl)phosphino)butanol, 2,2'-bis(mercaptomethyl)propane-1,3-diol, 2,2'-oxybis(methylene)bis(2-(mercaptomethyl)propane-1,3-diol), 3,5-dimercaptocyclohexanol, 2,4-dimercapto-cyclohexanol, 3,5-dimercaptophenol, 2,4-dimercaptophenol and 2,4-dimercapto-6-hydroxytoluene.

As the compound (A-2), it is especially preferred to use a compound having at least three primary amino groups among the above-mentioned compounds, and among them, from the viewpoint of compatibility with the polymer (B) and volatility in a case where the compound (A-2) is formed into a coating composition, it is preferred to use tris(2-aminoethyl)amine, tris(3-aminopropyl)amine, tris(4-aminobutyl)amine, 2-(aminomethyl)propane-1,3-diamine, 3-(2-aminoethyl)pentane-1,5-diamine, cyclohexane-1,3,5-triamine or cyclohexane-1,2,4-triamine, and it is particularly preferred to use tris(2-aminoethyl)amine or tris(3-aminopropyl)amine.

In the formula (A-3), $P^4$ and $P^5$ may respectively be the same one as the above $P^1$.

$P^4$ and $P^5$ may respectively be the same or different.

The bivalent polar functional group for $P^6$ may be the same one as the bivalent polar functional group mentioned in explanation for the above polar functional group. When m is an integer of at least 2, the "m" pieces of $P^6$ in the formula may respectively be the same or different.

$R^{17}$ and $R^{18}$ may respectively be the same one as the above $R^{15}$. When m is an integer of at least 2, the "m" pieces of $R^{17}$ in the formula may respectively be the same or different.

m is an integer of at least 1. The upper limit of m may be such that the molecular weight of the compound becomes at most 2,000. m is especially preferably from 1 to 100, more preferably from 2 to 50.

Specific examples of the compound (A-3) include an ethyleneimine derivative such as diethylenetriamine, triethylenetetramine, tetraethylenepentamine and polyethyleneimine; and a secondary amine having a hydroxy group or a mercapto group, such as di(2-hydroxyethyl)amine, N,N'-bis(2-hydroxyethyl)ethylenediamine, di(2-mercaptoethyl)amine, and N,N'-bis(2-mercaptoethyl)ethylenediamine.

As the compound (A-3), it is especially preferred to use an ethyleneimine derivative among the above-mentioned compounds, and among them, from the viewpoint of the compatibility with the polymer (B) and the volatility in a case where the compound (A-3) is formed into a coating composition, it is particularly preferred to use triethylenetetramine, tetraethylenepentamine or polyethyleneimine.

In the present invention, the compound (A) is preferably at least one member selected from the group consisting of the compounds (A-1) to (A-3), and from the viewpoint of the compatibility with the polymer (B), and the viewpoint of the volatility in a case where the compound (A) is formed into a coating composition, more preferred is at least one member selected from the group consisting of pentane-1,5-diamine, hexane-1,6-diamine, heptane-1,7-diamine, octane-1,8-diamine, cyclohexane-1,2-diamine, cyclohexane-1,3-diamine, cyclohexane-1,4-diamine, 3,3,4,4-tetrafluorohexane-1,6-diamine, 2,2,3,3,4,4,5,5-octafluorohexane-1,6-diamine, 3,3,4,4,5,5,6,6-octafluorooctane-1,8-diamine, 2,2,3,3,4,4,5,5,6,6,7,7-dodecafluorooctane-1,8-diamine, tris(2-aminoethyl)

amine, tris(3-aminopropyl)amine, tris(4-aminobutyl)amine, 2-(aminomethyl)propane-1,3-diamine, 3-(2-aminoethyl) pentane-1,5-diamine, cyclohexane-1,3,5-triamine, cyclohexane-1,2,4-triamine, triethylenetetramine, tetraethylenepentamine and polyethyleneimine, and most preferred is at least one member selected from the group consisting of tris(2-aminoethyl)amine, tris(3-aminopropyl)amine, cyclohexane-1,3-diamine, hexane-1,6-diamine, diethylenetriamine and polyethyleneimine.

In the present invention, the compound (A) may be used alone or in combination as a mixture of two or more of them. For example, a compound (such as the above compound (A-1)) having two polar functional groups and a compound (such as the above compound (A-2) or (A-3)) having at least three polar functional groups may be used in combination as a mixture.

In the present invention, the number of polar functional groups per molecule of the compound (A) contained in the composition is preferably from 2 to 100, more preferably from 2 to 80, furthermore preferably from 2 to 50.

Further, the number of the polar functional groups is the number of the polar functional groups of the compound when one type of the compound (A) is contained in the composition, or an average value when at least two compounds are used in combination as the compound (A). The average value is determined from the number of the polar functional groups and the ratio (molar ratio) of the content of the respective compounds. Accordingly, when e.g. a compound having two polar functional groups and a compound having at least three polar functional groups are used in combination, there is a case where the average value will not be an integer, such as 2.07, 2.16 or 2.30.

The content of the compound (A) in the composition in the present invention is preferably from 0.01 to 30 mass %, more preferably from 0.05 to 10 mass % to the content of the polymer (B). When the content is at least 0.01 mass %, it is possible to sufficiently obtain the effect of the present invention, and it is possible to secure stability with time and thermal stability of an electric charge adequate for electrets. When the content is at most 30 mass %, the miscibility with the polymer (B) becomes good, and the distribution in the composition becomes uniform.

[Polymer (B)]

The polymer (B) has reactive functional groups.

The reactive functional group of the polymer (B) is not particularly limited so long as it is reactive with the above polar functional groups, and one which is reactive with the polar functional groups may suitably be selected depending upon polar functional groups of the compound (A) to be used.

Here, "reactive" means that the reactive functional group is capable of being reacted with the above polar functional groups to form a bond.

As a specific example of the reactive functional group, the above-mentioned polar functional groups, a silanol group and an alkoxysilyl group may be mentioned, and among them, it may suitably be selected depending upon the type of the polar functional groups of the compound (A).

The combination with the polar functional groups of the compound (A) will be described later in detail, and for example, in a case where each of the above polar functional groups is at least one member selected from the group consisting of a primary amino group, a hydroxy group, a thiol group, a hydroxyphenyl group and a secondary amino group, a reactive functional group reactive with the polar functional group may specifically be e.g. a sulfonic group, a phosphono group, a carboxy group, an alkoxycarbonyl group, an acid halide group, a formyl group, a hydroxyphenyl group, an isocyanate group, a cyano group, a carbonyloxy group, a carbonate group, a silanol group, or an alkoxysilyl group. Further, in a case where each of the above polar functional group is at least one member selected from the group consisting of e.g. a sulfonic group, a phosphono group, a carboxy group, an alkoxycarbonyl group, an acid halide group, a formyl group, a hydroxyphenyl group, an isocyanate group, a cyano group, a carbonyloxy group and a carbonate group, the reactive functional group reactive with the polar functional group may specifically be e.g. a primary amino group, a hydroxy group, a thiol group, a hydroxyphenyl group, a secondary amino group or a silanol group.

Considering the strength of interaction with the above polar functional groups and the easiness of introduction into the polymer, the reactive functional groups are preferably at least one member selected from the group consisting of a carboxy group, an acid halide group, an alkoxycarbonyl group, a carbonyloxy group, a carbonate group, a sulfonic group, a phosphono group, a hydroxy group, a thiol group, a silanol group and an alkoxysilyl group.

In the present invention, considering e.g. combination of reactivity between the polar functional groups and the reactive functional groups, it is preferred that one of the above polar functional group and the above reactive functional group is at least one member selected from the group consisting of a primary amino group, a hydroxy group, a thiol group, a hydroxyphenyl group and a secondary amino group, and the other is at least one member selected from the group consisting of a sulfonic group, a phosphono group, a carboxy group, an alkoxycarbonyl group, an acid halide group, a formyl group, a hydroxyphenyl group, an isocyanate group, a cyano group, a carbonyloxy group and a carbonate group.

That is, when each of the above polar functional groups is at least one member selected from the group consisting of a primary amino group, a hydroxy group, a thiol group, a hydroxyphenyl group and a secondary amino group, each of the above reactive functional groups is preferably at least one member selected from the group consisting of a sulfonic group, a phosphono group, a carboxy group, an alkoxycarbonyl group, an acid halide group, a formyl group, a hydroxyphenyl group, an isocyanate group, a cyano group, a carbonyloxy group and a carbonate group. Further, when each of the above polar functional groups is at least one member selected from the group consisting of a sulfonic group, a phosphono group, a carboxy group, an alkoxycarbonyl group, an acid halide group, a formyl group, a hydroxyphenyl group, an isocyanate group, a cyano group, a carbonyloxy group and a carbonate group, each of the above reactive functional groups is preferably at least one member selected from the group consisting of a primary amino group, a hydroxy group, a thiol group, a hydroxyphenyl group and a secondary amino group.

Among the above, from the viewpoint of the excellent mutual reactivity and the easiness of introduction into the polymer (B), it is preferred that one of the above polar functional group and the above reactive functional group is at least one member selected from the group consisting of a primary amino group, a hydroxy group, a thiol group, a hydroxyphenyl group and a secondary amino group, and the other is at least one member selected from the group consisting of a carboxy group, an alkoxycarbonyl group, an acid halide group and a carbonate group.

It is particularly preferred that each of the above polar functional groups is at least one member selected from the group consisting of a primary amino group, a hydroxy group, a thiol group, a hydroxyphenyl group and a secondary amino group, and each of the above reactive functional groups is at least one member selected from the group consisting of a carboxy group, an alkoxycarbonyl group, an acid halide group and a carbonate group.

In the polymer (B), the position of the above reactive functional groups is not particularly limited. Considering e.g. the effect of the present invention and the production efficiency, the polymer (B) preferably has the above reactive functional groups at the main chain terminals and/or side chains, particularly preferably at the main chain terminals. Further, when it has the reactive functional groups at the side chains, it is preferred that the reactive functional groups are present at the side chain terminals.

The number average molecular weight of the polymer (B) is more than 2,000, preferably from 3,000 to 5,000,000, more preferably from 10,000 to 700,000. If the number average molecular weight is too small, there will be problems that formation of a film is difficult, and the heat resistance of the film deteriorates, whereby the thermal stability as an electret also deteriorates. If the number average molecular weight is too large, there will be a problem such that the polymer is hardly soluble in a solvent, and a process for forming a film would be restricted.

The intrinsic viscosity of the polymer (B) is not particularly limited, and it may suitably be selected depending upon e.g. the type of the polymer (B) to be used. For example, when the polymer (B) is a fluorinated cyclic polymer, the intrinsic viscosity (30° C.) is preferably from 0.1 to 0.9 dl/g, more preferably from 0.2 to 0.8 dl/g, most preferably from 0.2 to 0.6 dl/g.

The above intrinsic viscosity is preferably a value measured by using e.g. perfluoro(2-butyltetrahydrofuran) as a solvent.

Considering the charge retention performance as an electret, the polymer (B) preferably has a relative dielectric constant of from 1.8 to 8.0, more preferably from 1.8 to 5.0, particularly preferably from 1.8 to 3.0. The relative dielectric constant is a value measured in accordance with ASTM D150 at a frequency of 1 MHz.

Further, the polymer (B) is preferably one having a high volume resistivity and a large dielectric breakdown voltage.

The volume resistivity of the polymer (B) is preferably from $10^{10}$ to $10^{20}$ Ωcm, more preferably from $10^{16}$ to $10^{19}$ Ωcm. The volume resistivity is measured in accordance with ASTM D257.

The dielectric breakdown voltage of the polymer (B) is preferably from 10 to 25 kV/mm, more preferably from 15 to 22 kV/mm. The dielectric breakdown voltage is measured in accordance with ASTM D149.

The polymer (B) is preferably highly hydrophobic one so as to drain water which adversely affects insulation and to maintain high insulation.

The highly hydrophobic polymer may, for example, be a polymer containing fluorine atoms, a polymer having cyclic structure in its main chain, polyethylene, polypropylene, polystyrene, polyurethane, polydimethylsiloxane, polyethylene terephthalate or polycarbonate.

Among them, preferred is one containing fluorine atoms, one having a cyclic structure in its main chain, or one containing fluorine atoms and having a cyclic structure in its main chain.

Here, the "cyclic structure" may be an alicyclic structure or an aromatic ring structure.

Further, the "one having a cyclic structure in its main chain" means one wherein at least one of carbon atoms constituting the cyclic structure is a carbon atom constituting the main chain of the polymer.

The cyclic structure contained in the main chain is preferably an alicyclic structure from the viewpoint of relative dielectric constant and volume resistivity.

The "alicyclic structure" means a cyclic structure having no aromatic nature. The alicyclic structure may, for example, be a saturated or unsaturated hydrocarbon cyclic structure which may have a substituent, a heterocyclic structure having some of carbon atoms in such a hydrocarbon cyclic structure substituted by hetero atoms such as oxygen atoms or nitrogen atoms, or a fluorinated alicyclic structure having hydrogen atoms in such a hydrocarbon cyclic structure or heterocyclic structure substituted by fluorine atoms.

From the above viewpoints, the polymer (B) preferably has an alicyclic structure in its main chain or contain fluorine, more preferably has the above fluorinated alicyclic structure.

As a preferred polymer (B), the following ($\alpha$) to ($\gamma$) may be mentioned. Among them, ($\alpha$) is preferred.

($\alpha$) A polymer having a fluorinated alicyclic structure in its main chain (hereinafter referred to as "fluorinated cyclic polymer").

($\beta$) A polymer having an aliphatic hydrocarbon cyclic structure in its main chain
(hereinafter referred to as "cycloolefin polymer").

($\gamma$) A fluoropolymer having no alicyclic structure in its main chain (hereinafter referred to as "non-cyclic fluororesin").

Now, "fluorinated cyclic polymer", "cycloolefin polymer" and "non-cyclic fluororesin" will be described in detail.
(Fluorinated Cyclic Polymer)

As mentioned above, the "fluorinated cyclic polymer" is a fluoropolymer having a fluorinated alicyclic structure in its main chain and is meant for one wherein at least one of carbon atoms constituting the fluorinated alicyclic structure is a carbon atom constituting the main chain of the fluoropolymer.

Among the carbon atoms constituting the fluorinated alicyclic structure, a carbon atom constituting the main chain is derived from the polymerizable double bond of a monomer constituting the fluoropolymer.

For example, in a case where the fluoropolymer is a fluoropolymer obtained by polymerizing a cyclic monomer as described hereinafter, two carbon atoms constituting the double bond become the carbon atoms constituting the main chain.

Further, in the case of a fluoropolymer obtained by cyclopolymerizing a monomer having two polymerizable double bonds, at least two among the four carbon atoms constituting the two polymerizable double bonds become the carbon atoms constituting the main chain.

The fluorinated alicyclic structure may be one wherein the cyclic skeleton is constituted solely by carbon atoms, or a heterocyclic structure wherein a hetero atom such as an oxygen atom or a nitrogen atom is contained in addition to the carbon atoms. The fluorinated alicyclic ring is preferably a fluorinated alicyclic ring having one or two oxygen atoms in the cyclic skeleton.

The number of atoms constituting the cyclic skeleton of the fluorinated alicyclic structure is preferably from 4 to 7. That is, the fluorinated alicyclic structure is preferably a 4- to 7-membered ring.

As a preferred fluorinated cyclic polymer, the following fluorinated cyclic polymer (I') and fluorinated cyclic polymer (II') may be mentioned.

Fluorinated cyclic polymer (I'): a polymer having a unit based on a cyclic fluorinated monomer.

Fluorinated cyclic polymer (II'): a polymer having a unit formed by cyclopolymerization of a diene type fluorinated monomer.

The fluorinated cyclic polymer (I') has a unit based on the "cyclic fluorinated monomer".

The "cyclic fluorinated monomer" is a monomer having a polymerizable double bond between carbon atoms constituting a fluorinated alicyclic ring, or a monomer having a polymerizable double bond between a carbon atom constituting a fluorinated alicyclic ring and a carbon atom of other than a fluorinated alicyclic ring.

Such a cyclic fluorinated monomer is preferably the following compound (1) or compound (2).

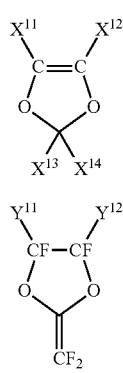

In the above formulae, each of $X^{11}, X^{12}, X^{13}, X^{14}, Y^{11}$ and $Y^{12}$ which are independent of one another, is a fluorine atom, a perfluoroalkyl group or a perfluoroalkoxy group.

The perfluoroalkyl group for $X^{11}, X^{12}, X^{13}, X^{14}, Y^{11}$ and $Y^{12}$ has preferably from 1 to 7, more preferably from 1 to 4, carbon atoms. Such a perfluoroalkyl group is preferably linear or branched, more preferably linear. Specifically, it may, for example, be a trifluoromethyl group, a pentafluoroethyl group or a heptafluoropropyl group, and particularly preferred is a trifluoromethyl group.

The perfluoroalkoxy group for $X^{11}, X^{12}, X^{13}, X^{14}, Y^{11}$ and $Y^{12}$ may, for example, be one having an oxygen atom (—O—) bonded to the above perfluoroalkyl group.

$X^{11}$ is preferably a fluorine atom.

$X^{12}$ is preferably a fluorine atom, a trifluoromethyl group or a $C_{1-4}$ perfluoroalkoxy group, more preferably a fluorine atom or a trifluoromethoxy group.

Each of $X^{13}$ and $X^{14}$ which are independent of each other, is preferably a fluorine atom or a $C_{1-4}$ perfluoroalkyl group, more preferably a fluorine atom or a trifluoromethyl group.

Each of $Y^{11}$ and $Y^{12}$ which are independent of each other, is preferably a fluorine atom, a $C_{1-4}$ perfluoroalkyl group or a $C_{1-4}$ perfluoroalkoxy group, more preferably a fluorine atom or a trifluoromethyl group.

In the compound (1), $X^{13}$ and $X^{14}$ may be bonded to each other to form a fluorinated alicyclic ring together with the carbon atom to which $X^{13}$ and $X^{14}$ are bonded.

Such a fluorinated alicyclic ring is preferably a 4- to 6-membered ring.

Such a fluorinated alicyclic ring is preferably a saturated alicyclic ring.

Such a fluorinated alicyclic ring may have an etheric oxygen atom (—O—) in the cyclic skeleton. In such a case, the number of etheric oxygen atoms in the fluorinated alicyclic ring is preferably 1 or 2.

In the compound (2), $Y^{11}$ and $Y^{12}$ may be bonded to each other to form a fluorinated alicyclic ring together with the carbon atoms to which $Y^{11}$ and $Y^{12}$ are bonded.

Such a fluorinated alicyclic ring is preferably a 4- to 6-membered ring.

Such a fluorinated alicyclic ring is preferably a saturated alicyclic ring.

Such a fluorinated alicyclic ring may have an etheric oxygen atom (—O—) in the cyclic skeleton. In such a case, the number of etheric oxygen atoms in the fluorinated alicyclic ring is preferably 1 or 2.

Preferred specific examples of the compound (1) include compounds (1-1) to (1-5).

Preferred specific examples of the compound (2) include compounds (2-1) and (2-2).

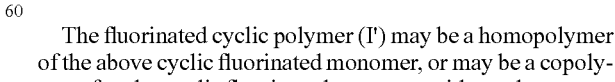

The fluorinated cyclic polymer (I') may be a homopolymer of the above cyclic fluorinated monomer, or may be a copolymer of such a cyclic fluorinated monomer with another monomer.

However, in such a fluorinated cyclic polymer (I'), the proportion of the unit based on the cyclic fluorinated monomer is preferably at least 20 mol %, more preferably at least 40 mol %, or may be 100 mol %, based on the total of all repeating units constituting the fluorinated cyclic polymer (I').

Said another monomer may be one copolymerizable with the above cyclic fluorinated monomer and is not particularly limited. Specifically, the after-mentioned diene-type fluorinated monomer, a monomer having the above reactive functional group in the side chain, tetrafluoroethylene, chlorotrifluoroethylene or perfluoro(methyl vinyl ether) may, for example, be mentioned.

The monomer having the above reactive functional group in the side chain, copolymerizable with the above cyclic fluorinated monomer, may be a fluorinated monomer such as methyl 2,2,3,3,4,4-hexafluoro-4-(1,2,2-trifluorovinyloxy) butanoate, methyl 2,2,3,3,-tetrafluoro-3-(1,1,2,2,3,3-hexafluoro-3-(1,2,2-trifluorovinyloxy)propoxy)propanoate, 1,1,2,2-tetrafluoro-2-(1,1,1,2,3,3-heaxfluoro-3-(1,2,2-trifluorovinyloxy)propan-2-yloxy)ethanesulfonyl fluoride or 1,1,2,2-tetrafluoro-2-(1,2,2-trifluorovinyloxy)ethanesulfonyl fluoride, or a hydrocarbon monomer such as hydroxyethyl vinyl ether, hydroxypropyl vinyl ether, hydroxybutyl vinyl ether, 2-(2-(vinyloxy)ethoxy)ethanol, methyl acrylate or hydroxyethyl acrylate.

The fluorinated cyclic polymer (II') has a unit formed by cyclopolymerization of "a diene type fluorinated monomer".

The "diene-type fluorinated monomer" is a monomer having two polymerizable double bonds and fluorine atoms. Such polymerizable double bonds are not particularly limited, but are preferably vinyl groups, allyl groups, acryloyl groups or methacryloyl groups.

The diene-type fluorinated monomer is preferably the following compound (3).

$$CF_2=CF-Q-CF=CF_2 \quad (3)$$

In the formula, Q is a $C_{1-3}$ perfluoroalkylene group which may have an etheric oxygen atom and wherein some of fluorine atoms may be substituted by halogen atoms other than fluorine atoms. Such halogen atoms other than fluorine atoms may, for example, be chlorine atoms or bromine atoms.

In a case where Q is a perfluoroalkylene group having an etheric oxygen atom, the etheric oxygen atom in the perfluoroalkylene group may be present at one terminal of the group or may be present at both terminals of the group, or may be present between carbon atoms of the group. From the viewpoint of the cyclopolymerizability, it is preferably present at one terminal of the group.

The following compounds may be mentioned as specific examples of the compound (3).

$CF_2=CFOCF_2CF=CF_2$,

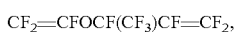
$CF_2=CFOCF(CF_3)CF=CF_2$,

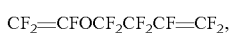
$CF_2=CFOCF_2CF_2CF=CF_2$,

$CF_2=CFOCF_2CF(CF_3)CF=CF_2$,

$CF_2=CFOCF(CF_3)CF_2CF=CF_2$,

$CF_2=CFOCFClCF_2CF=CF_2$,

$CF_2=CFOCCl_2CF_2CF=CF_2$,

$CF_2=CFOCF_2OCF=CF_2$,

$CF_2=CFOC(CF_3)_2OCF=CF_2$,

$CF_2=CFOCF_2CF(OCF_3)CF=CF_2$,

$CF_2=CFCF_2CF=CF_2$,

$CF_2=CFCF_2CF_2CF=CF_2$,

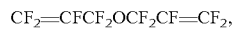
$CF_2=CFCF_2OCF_2CF=CF_2$,

As the unit to be formed by cyclopolymerization of the compound (3), the following units (3-1) to (3-4) may be mentioned.

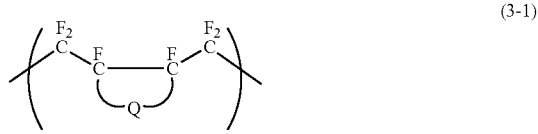

(3-1)

(3-2)

(3-3)

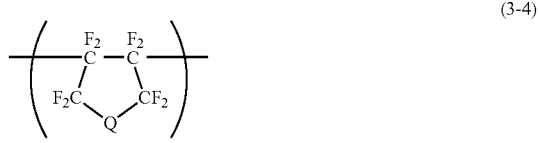

(3-4)

The fluorinated cyclic polymer (II') may be constituted solely by a unit formed by cyclopolymerization of the above diene-type fluorinated monomer, or may be a copolymer of such a unit with another unit.

However, in such a fluorinated cyclic polymer (II'), the proportion of the unit formed by cyclopolymerization of the diene-type fluorinated monomer is preferably at least 50 mol %, more preferably at least 80 mol %, most preferably 100 mol %, based on the total of all repeating units constituting the fluorinated cyclic polymer (II').

Said another monomer may be one copolymerizable with the above diene-type fluorinated monomer and is not particularly limited. Specifically, a cyclic fluorinated monomer such as the above-mentioned compound (1) or (2), a monomer having the above reactive functional group in the side chain, tetrafluoroethylene, chlorotrifluoroethylene, or perfluoro(methyl vinyl ether) may, for example, be mentioned.

The monomer having the above reactive functional group in the side chain, copolymerizable with the above diene type fluorinated monomer, may, for example, be a fluorinated monomer such as methyl 2,2,3,3,4,4-hexafluoro-4-(1,2,2,-trifluorovinyloxy)butanoate, methyl 2,2,3,3-tetrafluoro-3-(1,1,2,2,3,3-hexafluoro-3-(1,2,2-trifluorovinyloxy)propoxy)propanoate, 1,1,2,2-tetrafluoro-2-(1,1,1,2,3,3-hexafluoro-3-(1,2,2-trifluorovinyloxy)propan-2-yloxy)ethanesulfonyl fluoride or 1,1,2,2,-tetrafluoro-2-(1,2,2-trifluorovinyloxy) ethanesulfonyl fluoride, or a hydrocarbon monomer such as hydroxyethyl vinyl ether, hydroxypropyl vinyl ether, hydroxybutyl vinyl ether, 2-(2-(vinyloxy)ethoxy)ethanol, methyl acrylate or hydroxyethyl acrylate.

(Cycloolefin Polymer)

As mentioned above, the "cycloolefin polymer" is a polymer having an aliphatic hydrocarbon cyclic structure in the main chain and is meant for one wherein at least two among carbon atoms constituting such an aliphatic hydrocarbon cyclic structure are incorporated in the main chain of the polymer.

The cycloolefin polymer has a unit having an aliphatic hydrocarbon cyclic structure (hereinafter sometimes referred to as a unit (a1)), and in such a unit (a1), at least two among carbon atoms constituting such an aliphatic hydrocarbon cyclic structure are incorporated in the main chain of the polymer.

As the cycloolefin polymer, preferred may be one containing the following unit (a1-1):

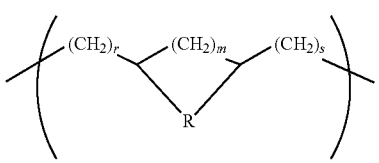

(a1-1)

wherein R is a bivalent hydrocarbon group which may have a substituent, m is an integer of from 0 to 10, r is 0 or 1, and s is 0 or 1.

In the formula (a1-1), the hydrocarbon group for R "may have a substituent", means that some or all of hydrogen atoms in the hydrocarbon group may be substituted by substituents.

Such a substituent may, for example, be an alkyl group, a cycloalkyl group, an alkoxy group, an aryl group such as a phenyl group, or a polycyclic aliphatic hydrocarbon group such as an adamantyl group.

The alkyl group as the substituent may be linear or branched and has preferably from 1 to 10, more preferably from 1 to 3, carbon atoms. Such an alkyl group is preferably a methyl group, an ethyl group, a propyl group or an isopropyl group, particularly preferably a methyl group or an ethyl group.

The cycloalkyl group as the substituent has preferably from 3 to 10, more preferably from 5 to 8, carbon atoms. Such a cycloalkyl group is particularly preferably a cyclopentyl group or a cyclohexyl group.

The alkoxy group as the substituent may be one having an oxygen atom (—O—) bonded to the above alkyl group.

The hydrocarbon group for R may be in a chain form or cyclic. Further, such a hydrocarbon group may be saturated or unsaturated, preferably saturated. The chain form hydrocarbon group is preferably a linear alkylene group which may have a substituent, and it has preferably from 1 to 4, more preferably from 2 to 3, most preferably 2, carbon atoms. Specifically, a dimethylene group may be mentioned.

The cyclic hydrocarbon group is preferably a group having two hydrogen atoms removed from a monocyclic or polycyclic cycloalkane which may have a substituent. The monocyclic cycloalkane may, for example, be cyclopentane or cyclohexane. The polycyclic cycloalkane may, for example, be norbornane or adamantane. Among them, cyclopentane or norbornane is preferred.

In the formula (a1-1), m is an integer of from 0 to 10.

When m is an integer of at least 1, as in the after-mentioned unit (a1-11), the polymer main chain is bonded not at the o-position but with a space of at least one methylene chain, of the aliphatic hydrocarbon cyclic structure, so that the aliphatic hydrocarbon cyclic structure is incorporated in the polymer main chain. In such a case, m is preferably from 1 to 3, most preferably 1.

When m is 0, as shown in the after-mentioned unit (a1-21), the polymer main chain is bonded at the o-position of the aliphatic hydrocarbon cyclic structure, so that the aliphatic hydrocarbon cyclic structure is incorporated in the polymer main chain.

Each of r and s may be 0 or 1.

Particularly when m is 0, r and s are preferably 0. Further, when m is 1, r and s are preferably 1.

As the unit (a1-1), preferred may, for example, be the following unit (a1-11) or unit (a1-21).

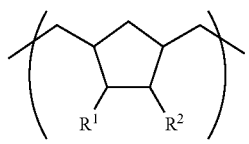

(a1-11)

wherein each of $R^1$ and $R^2$ which are independent of each other, is a hydrogen atom, an alkyl group or a cycloalkyl group, or $R^1$ and $R^2$ may be bonded to each other to form a ring.

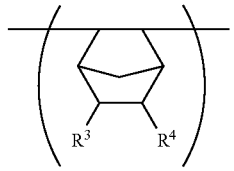

(a1-21)

wherein each of $R^3$ and $R^4$ which are independent of each other, is a hydrogen atom, an alkyl group or a cycloalkyl group, or $R^3$ and $R^4$ may be bonded to each other to form a ring.

In the formula (a1-11), the alkyl group and the cycloalkyl group for each of $R^1$ and $R^2$ may, respectively, be the same one as the alkyl group and the cycloalkyl group mentioned as the above substituent.

$R^1$ and $R^2$ may be bonded to each other to form a ring together with the carbon atoms to which $R^1$ and $R^2$ are respectively bonded. In such a case, the ring to be formed is preferably a monocyclic or polycyclic cycloalkane. The monocyclic cycloalkane may, for example, be cyclopentane or cyclohexane. The polycyclic cycloalkane may, for example, be norbornane or adamantane. Among them, cyclopentane or norbornane is preferred.

Such a ring may have a substituent. The substituent may, for example, be the same one as the substituent which the above-mentioned hydrocarbon group for R may have.

Specific examples of the unit (a1-11) in a case where $R^1$ and $R^2$ form a ring, include the following units (a1-11-1) and (a1-12-1).

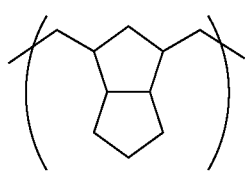

(a1-11-1)

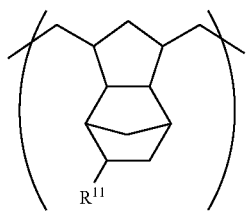
(a1-12-1)

wherein $R^{11}$ is a hydrogen atom or an alkyl group.

The alkyl group for $R^{11}$ may, for example, be the same one as the alkyl group mentioned as the substituent which the above-mentioned hydrocarbon group for R may have, and particularly preferred is a methyl group.

In the present invention, the unit (a1-11) is preferably one wherein $R^1$ and $R^2$ form a ring, or one wherein at least one of $R^1$ and $R^2$ is a cycloalkyl group.

In the formula (a1-21), $R^3$ and $R^4$ are, respectively, the same as the above $R^1$ and $R^2$.

Specific examples of the unit (a1-21) in a case where $R^3$ and $R^4$ form a ring, include the following units (a1-21-1) and (a1-21-2).

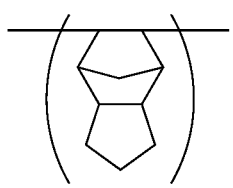
(a1-21-1)

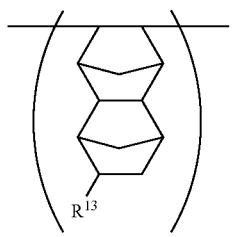
(a1-21-2)

wherein $R^{13}$ is a hydrogen atom or an alkyl group.

The alkyl group for $R^{13}$ may, for example, be the same one as the alkyl group mentioned as the substituent which the above-mentioned hydrocarbon group for R may have, and particularly preferred is a methyl group.

The cycloolefin polymer may contain one or more types among the above-described units, as the unit (a1).

The proportion of the unit (a1) in the cycloolefin polymer is preferably at least 30 mol %, more preferably at least 40 mol %, or may be 100 mol %, based on the total of all repeating units constituting the cycloolefin polymer.

The cycloolefin polymer may contain a unit other than the unit (a1) (hereinafter sometimes referred to as a unit (a2)).

As the unit (a2), an optional unit which has been used for a cycloolefin polymer, may be used without any particular limitation.

As such a unit (a2), a unit based on an olefin which may have a substituent, is preferred, and as such a unit, the following unit (a2-1) may, for example, be mentioned.

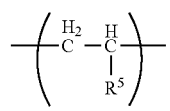
(a2-1)

wherein $R^5$ is a hydrogen atom, an alkyl group or an aryl group.

In the formula, the alkyl group for $R^5$ may be the same one as the alkyl group mentioned as the substituent which the above-mentioned hydrocarbon group for R may have.

The aryl group may, for example, be a benzyl group, a phenyl group, a p-tolyl group, a m-tolyl group, a p-fluorophenyl group, a m-fluorophenyl group, an o-fluorophenyl group, a p-trifluorophenyl group, a m-trifluorophenyl group, an o-trifluorophenyl group, a 1-naphthyl group or a 2-naphthyl group.

The cycloolefin polymer to be used in the present invention is particularly preferably the following cycloolefin polymer (I) or cycloolefin polymer (II).

Cycloolefin polymer (I): a cycloolefin polymer containing the above unit (a1-11).

Cycloolefin polymer (II): a cycloolefin polymer containing the above unit (a1-21) and the unit (a2).

The cycloolefin polymer (I) may contain one or more types as the unit (a1-11).

Further, the cycloolefin polymer (I) may contain a unit other than the unit (a1-11) within a range not to impair the effects of the present invention.

In the cycloolefin polymer (I), the proportion of the unit (a1-11) is preferably at least 80 mol %, more preferably at least 90 mol %, particularly preferably 100 mol %, based on the total of all repeating units constituting the cycloolefin polymer (I). That is, as the cycloolefin polymer (I), a polymer composed solely of the unit (a1-11) is particularly preferred.

The cycloolefin polymer (II) may contain one or more types as each of the unit (a1-21) and the unit (a2).

Further, the cycloolefin polymer (II) may contain a unit other than the unit (a1-21) and the unit (a2) within a range not to impair the effects of the present invention.

In the cycloolefin polymer (II), the proportion of the unit (a1-21) is preferably from 20 to 70 mol %, more preferably from 30 to 50 mol %, based on the total of all repeating units constituting the cycloolefin polymer (II). Further, the proportion of the unit (a2) is preferably from 30 to 80 mol %, more preferably from 50 to 70 mol %, based on the total of all repeating units constituting the cycloolefin polymer (II).

Further, the content ratio (molar ratio) of the unit (a1-21) to the unit (a2) in the cycloolefin polymer (II) is preferably within a range of the unit (a1-21): the unit (a2)=20:80 to 70:30, more preferably within a range of 30:70 to 50:50.

Preferred specific examples of the cycloolefin polymer (II) include copolymers containing two types of units respectively shown by the following formulae (II-1) and (II 2):

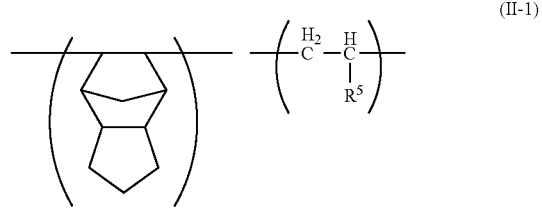
(II-1)

(II-2)

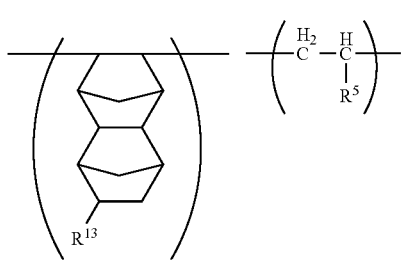

wherein $R^{13}$ and $R^5$ are, respectively, as defined above.

As the cycloolefin polymer, a commercially available one may be employed, or it may be synthesized.

As methods for the synthesis of the cycloolefin polymer, the following (1) to (7) are, for example, known.

(1) A method wherein a norbornene and an olefin are subjected to addition copolymerization (e.g. a method shown by the following reaction formula (1')).

(2) A method wherein a ring opened metathesis polymer of a norbornene is subjected to hydrogenation (e.g. a method shown by the following reaction formula (2'))

(3) A method wherein an alkylidene norbornene is subjected to transannular polymerization (e.g. a method shown by the following reaction formula (3')).

(4) A method wherein a norbornene is subjected to addition polymerization (e.g. a method shown by the following reaction formula (4')).

(5) A method wherein 1,2- and 1,4-addition polymers of cyclopentadiene are subjected to hydrogenation (e.g. a method shown by the following reaction formula (5')).

(6) A method wherein 1,2- and 1,4-addition polymers of cyclohexadiene are subjected to hydrogenation (e.g. a method shown by the following reaction formula (6')).

(7) A method wherein a conjugated diene is subjected to cyclopolymerization (e.g. a method shown by the following reaction formula (7')).

(1')

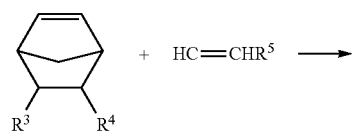

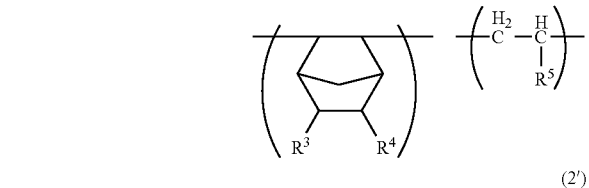

(2')

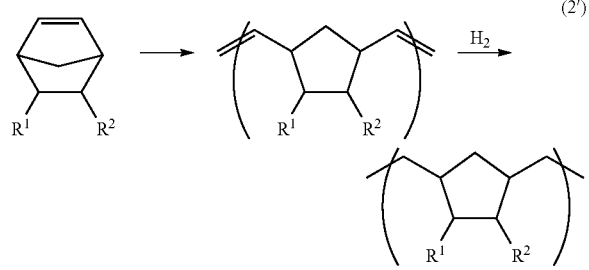

(3')

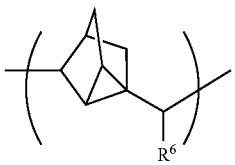

(4')

(5')

(6')

(7')

In each reaction formula, $R^1$ to $R^5$ are as defined above.

Each of $R^6$ and $R^7$ which are independent of each other, is an alkyl group, and such an alkyl group may be the same one as the alkyl group mentioned as a substituent which the above-mentioned hydrocarbon group for R may have.

Among them, preferred are a cycloolefin polymer obtainable by the method (1) (an addition copolymer of a norbornene and an olefin) and a cycloolefin polymer obtainable by the method (2) (a hydrogenated polymer of a ring opened metathesis polymer of a norbornene) in view of the excellent film-forming property and efficiency in their syntheses.

The addition copolymer of a norbornene may, for example, be one commercially available under a tradename of APEL (registered trademark) (manufactured by Mitsui Chemicals Inc.) or TOPAS (registered trademark) (manufactured by Ticona).

As the hydrogenated polymer of a ring-opened metathesis polymer of a norbornene, various ones are available, but polymers commercially available under tradenames of ZEONEX (registered trademark) (manufactured by ZEON CORPORATION), ZEONOR (registered trademark) (manufactured by ZEON CORPORATION) and ARTON (registered trademark) (manufactured by JSR Corporation) are preferred since they have transparency, low moisture absorption and heat resistance.

(Non-Cyclic Fluororesin)

The "non-cyclic fluororesin" means a fluororesin having no aliphatic hydrocarbon cyclic structure in its main chain, as mentioned above.

The non-cyclic fluororesin may, for example, be polytetrafluoroethylene, an ethylene/tetrafluoroethylene copolymer (ETFE), a tetrafluoroethylene/perfluoro(alkyl vinyl ether) copolymer (PFA) or a fluoroolefin/alkyl vinyl ether copolymer, and from the viewpoint of high amorphousness of a simple substance of a resin and easiness of mixing with a compound having at least two polar functional groups, a fluoroolefin/vinyl ether copolymer is preferred.

The fluoroolefin/vinyl ether copolymer may be a copolymer having repeating units based on a fluoroolefin selected from tetrafluoroethylene and chlorotrifluoroethylene, repeating units based on a vinyl ether, and as the case requires, repeating units based on other monomers (preferably a vinyl ester, an allyl ether, an allyl ester, an isopropenyl ether or an isopropenyl ester) other than a fluoroolefin and a vinyl ether.

The vinyl ether is preferably a vinyl ether having at most 10 carbon atoms, such as an alkyl vinyl ether, a fluoroalkyl vinyl ether, a hydroxyalkyl vinyl ether, a cycloalkyl vinyl ether or a hydroxycycloalkyl vinyl ether.

The vinyl ester is preferably a vinyl ester having at most 10 carbon atoms, such as vinyl acetate or vinyl pivalate.

The allyl ether is preferably an alkyl allyl ether or a hydroxyalkyl allyl ether having at most 10 carbon atoms.

The isopropenyl ether is preferably an alkyl isopropenyl ether or a hydroxyalkyl isopropenyl ether having at most 10 carbon atoms.

The allyl ester is preferably e.g. allyl acetate.

The isopropenyl ester is preferably e.g. isopropenyl acetate.

As the polymer (B), a commercial product may be employed, or it may be synthesized.

As a process for producing the polymer (B), a conventional method may be applied, and a method wherein polymerization is carried out by employing, as a polymerization initiator, one having the above reactive functional group to obtain a polymer having the reactive functional groups introduced at the terminal of the main chain, a method wherein polymerization is carried out by employing, as a polymerization initiator, one having a group convertible to the above reactive functional group to obtain a polymer having the groups introduced at the terminal of the main chain, and the groups are converted to the above reactive functional groups, a method wherein polymerization is carried out by employing, as a monomer, one having the above reactive functional group in its side chain to obtain a polymer having the reactive functional groups introduced into the side chains, or a method wherein a polymer is obtained by employing, as a monomer, one having a group convertible to the above reactive functional group in its side chain, and the groups are converted to the reactive functional groups to obtain a polymer having the reactive functional groups introduced into the side chains, may, for example, be mentioned.

The polymer (B) is preferably one or more of the above fluorinated cyclic polymer, cycloolefin polymer and non-cyclic fluororesin.

As commercial products of the fluorinated cyclic polymer having the above reactive functional group at the main chain terminals and/or side chains, CYTOP (registered trademark, manufactured by Asahi Glass Company, Limited) may be mentioned.

As commercial products of the non-cyclic fluororesin having the above reactive functional groups at the main chain terminals and/or side chains, Flemion (registered trademark, manufactured by Asahi Glass Company, Limited) and Lumiflon (registered trademark, manufactured by Asahi Glass Company, Limited) may, for example, be mentioned. Flemion is a fluoroolefin copolymer having a carboxy group at the side chain terminals, and Lumiflon is a fluoroolefin/vinyl ether copolymer having a hydroxy group at the side chain terminals.

As a combination of the compound (A) and the polymer (B), a combination of the compound (A-1) or (A-2) and the fluoropolymer is preferred, and a combination of a diamine or a compound having at least three primary amino groups and a fluoropolymer having an alicyclic structure is particularly preferred.

Among them, a combination of tris(2-aminoethyl)amine or tris(3-aminopropyl)amine and a fluoropolymer having an alicyclic structure is most preferred.

In the present invention, the above composition may contain an optional component such as a silane coupling gent, other than the compound (A) and the polymer (B). When the composition contains a silane coupling agent, in a case where a coating film is formed from the composition as a coating fluid as described hereinafter, the adhesion between the substrate and the coating film formed is improved.

The silane coupling agent is not particularly limited, and a wide range of silane coupling agents including known or well known agents may be used. The following ones may specifically be exemplified.

A monoalkoxysilane such as trimethylmethoxysilane, trimethylethoxysilane, dimethylvinylmethoxysilane or dimethylvinylethoxysilane.

A dialkoxysilane such as γ-chloropropylmethyldimethoxysilane, γ-chloropropylmethyldiethoxysilane, γ-aminopropylmethyldiethoxysilane, γ-aminopropylmethyldimethoxysilane, N-(β-aminoethyl)-γ-aminopropylmethyldimethoxysilane, N-(β-aminoethyl)-γ-aminopropylmethyldiethoxysilane, γ-glycidyloxypropylmethyldimethoxysilane, γ-glycidyloxypropylmethyldiethoxysilane, γ-methacryloyloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8,8-tridecafluorooctylmethyldimethoxysilane or 3,3,4,4,5,5,6,6,7,7,8,8,9,9,10,10,10-heptadecafluorodecylmethyldimethoxysilane.

A tri- or tetra-alkoxysilane such as γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane, γ-mercaptopropyltrimethoxysilane, γ-glycidyloxypropyltrimethoxysilane, γ-glycidyloxypropyltriethoxysilane, γ-methacryloyloxypropyltrimethoxysilane, γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane or tetraethoxysilane.

Further, as a preferred silane coupling agent, an aromatic amine type silane coupling agent being a silane coupling agent having an aromatic amine structure may be mentioned.

Compounds represented by the following formulae (s1) to (s3) may be mentioned as such an aromatic amine type silane coupling agent.

ArSi(OR$^{21}$)(OR$^{22}$)(OR$^{23}$)  (s1)

ArSiR$^{24}$(OR$^{21}$)(OR$^{22}$)  (s2)

ArSiR$^{24}$R$^{25}$(OR$^{21}$)  (s3)

wherein each of R$^{21}$ to R$^{25}$ which are independent of one another, is a hydrogen atom, a C$_{1-20}$ alkyl group or an aryl group, and Ar is a p-, m- or o-aminophenyl group.

As specific examples of the compounds represented by the formulae (s1) to (s3), the following ones may be mentioned.

Aminophenyltrimethoxysilane, aminophenyltriethoxysilane, aminophenyltripropoxysilane, aminophenyltriisopropoxysilane, aminophenylmethyldimethoxysilane, aminophenylmethyldiethoxysilane, aminophenylmethyldipropoxysilane, aminophenylmethyldiisopropoxysilane, aminophenylphenyldimethoxysilane, aminophenylphenyldiethoxysilane, aminophenylphenyldipropoxysilane, aminophenylphenyldiisopropoxysilane, etc.

A hydrogen atom of an amino group in these compounds may be substituted by an alkyl group or an aryl group. For example, N,N-dimethylaminophenyltrialkoxysilane or N,N-dimethylaminophenylmethyldialkoxysilane may, for example, be mentioned. In addition, for example, aromatic amine type silane coupling agents disclosed in the specification of U.S. Pat. No. 3,481,815 may be used.

The above silane coupling agents may be used alone, or two or more of them may be used in combination.

Further, a co-partial hydrolysate of the above silane coupling agents may preferably be used.

Further, a co-partial hydrolysate of the above silane coupling agent with a tetraalkoxysilane such as tetramethoxysilane, tetraethoxysilane or tetrapropoxysilane, may also preferably be used. Among them, as one to be uniformly mixed in the polymer (B) and improve the adhesion, a silane coupling agent having an amino group (such as γ-aminopropyltriethoxysilane, γ-aminopropylmethyldiethoxysilane, γ-aminopropyltrimethoxysilane, γ-aminopropylmethyldimethoxysilane, N-((β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, aminophenyltrimethoxysilane, aminophenyltriethoxysilane, aminophenylmethyldimethoxysilane or aminophenylmethyldiethoxysilane) or a silane coupling agent having an epoxy group (such as γ-glycidyloxypropyltrimethoxysilane, γ-glycidyloxypropylmethyldimethoxysilane, γ-glycidyloxypropyltriethoxysilane or γ-glycidyloxypropylmethyldiethoxysilane) may be exemplified as a particularly preferred one.

The content of the silane coupling agent is preferably from 0.1 to 20 mass %, more preferably from 0.3 to 10 mass %, most preferably from 0.5 to 5 mass %. When the content is within such a range, it is possible to uniformly mix the agent with the polymer (B), and phase separation in a solution hardly occurs.

As the optional component other than the silane coupling agent, an inorganic substance such as a metal oxide or a metal nitride, an organic metal compound or an organic metal complex may, for example, be mentioned.

The electret of the present invention can be produced in such a manner that a composition containing the above compound (A), the polymer (B) and an optional component is employed to form a coating film, and the electric charge is injecting to the coating film.

The method for forming a coating film made of the above composition is not particularly limited, and a conventional film-forming method may be used depending upon the material to be used. For example, the film forming may be carried out by a wet coating method or by press-forming a film. Otherwise, film forming may be carried out by a dry process such as vapor deposition, CVD or sputtering. Particularly from the viewpoint of the film forming process, film forming is preferably carried out by a wet coating method.

In a case where film forming is carried out by a wet coating method, the coating film is formed by coating the surface of a substrate with a solution (a coating fluid) having the above composition dissolved in a solvent, followed by drying by e.g. baking.

The coating fluid may be prepared by preliminarily preparing a composition containing the respective components, and dissolving it in a solvent, or may be prepared by dissolving the respective components in solvents, respectively, and mixing these solutions.

In the case of preliminarily preparing a composition containing the respective components, as a method for producing the composition, a solid and a solid or a solid and a liquid may be mixed by e.g. kneading or eutectic extrusion, or solutions obtained by dissolving the components in solvents which dissolves the respective components, may be mixed with each other. From the viewpoint of film forming, it is more preferred that solutions are mixed with each other.

The electret of the present invention may be produced in such a manner that, for example, the above compound (A) and the polymer (B) are respectively dissolved in solvents and mixed to prepare a coating composition comprising the compound (A), the polymer (B) and the solvent, and by using it, a coating film is formed (film forming), and electric charge is injected to the coating film.

In the above preparation of the coating fluid, as a solvent, one which can dissolve at least the polymer (B) is employed, and one which can dissolve both of the polymer (B) and the compound (A) is preferably employed. The solvent may be suitably selected from known solvents depending upon the types of the polymer (B) and the compound (A) to be used.

For example, as a solvent which can dissolve the above "fluorinated cyclic polymer" and "non-cyclic fluororesin", a fluorinated organic solvent may be used.

As the fluorinated organic solvent, an aprotic fluorinated solvent is preferred. As the aprotic fluorinated solvent, the following fluorinated compounds may be exemplified.

A polyfluoroaromatic compound such as perfluorobenzene, pentafluorobenzene, 1,3-bis(trifluoromethyl)benzene or 14-bis(trifluoromethyl)benzene, a polyfluorotrialkylamine compound such as perfluorotributylamine or perfluorotripropylamine, a polyfluorocycloalkane compound such as perfluorodecalin, perfluorocyclohexane or perfluoro(1,3,5-trimethylcyclohexane), a polyfluorocyclic ether compound such as perfluoro(2-butyltetrahydrofuran), a perfluoropolyether, a polyfluoroalkane compound such as perfluorohexane, perfluorooctane, perfluorodecane, perfluorododecane, perfluoro (2,7-dimethyloctane), 1,1,2-trichloro-1,2,2-trifluoroethane, 1,1,1-trichloro-2,2,2-trifluoroethane, 1,3-dichloro-1,1,2,2,3-pentafluoropropane, 1,1,1,3-tetrachloro-2,2,3,3-tetrafluoropropane, 1,1,3,4-tetrachloro-1,2,2,3,4,4-hexafluorobutane, perfluoro(1,2-dimethylhexane), perfluoro(1,3-dimethylhexane), 1,1,2,2,3,3,5,5,5-decafluoropentane, 1,1,1,2,2,3,3,4,4, 5,5,6,6-tridecafluorohexane, 1,1,1,2,2,3,3,4,4,5,5,6,6,7,7,8,8-heptadecafluorooctane, 1,1,1,2,2,3,3,4,4,5,5,6,6,7,7,8,8,9,9,10,10-henicosafluorodecane, 1,1,1,2,2,3,3,4,4-nonafluorohexane, 1,1,1,2,2,3,3,4,4,5,5,6,6-tridecafluorooctane, 1,1,1,2,2,3,3,4,4,5,5,6,6,7,7,8,8-heptadecafluorodecane, 1,1,1,2,3,4,5,5,5-nonafluoro-4-(trifluoromethyl)pentane, 1,1,1,2,2,3,5,5,5-nonafluoro-4-(trifluoromethyl)pentane, 3,3-dichloro-1,1,1,2,2-pentafluoropropane or 1,3-dichloro-1,1,2,2,3-pentafluoropropane.

These aprotic fluorinated solvents may be used alone or in combination as a mixture. Further, a wide range of compounds may be used other than these compound. For example, a fluorinated solvent such as hydrofluoroether (HFE) is suitable. Such a fluorinated solvent is preferably a fluorinated solvent represented by the general formula $R^a$—O—$R^b$ (wherein $R^a$ is a $C_{5-12}$ linear or branched polyfluoroalkyl group which may have an ether bond, and $R^b$ is a $C_{1-5}$ linear or branched alkyl group or a polyfluoroalkyl group).

If the number of carbon atoms of $R^a$ is at most 4, a polymer containing a fluorinated cyclic structure is hardly soluble therein, and if the number of carbon atoms of $R^a$ is at least 13, such a solvent is hardly industrially available, and therefore the number of carbon atoms of $R^a$ is selected from the range of from 5 to 12. The number of carbon atoms of $R^a$ is preferably from 6 to 10, more preferably from 6 to 7 and 9 to 10.

The polyfluoroalkyl group is a group wherein at least two hydrogen atoms in an alkyl group are substituted by fluorine atoms and includes a perfluoroalkyl group wherein all hydrogen atoms in an alkyl group are substituted by fluorine atoms and a group wherein at least two hydrogen atoms in an alkyl group are substituted by fluorine atoms and at least one hydrogen atom in the alkyl group is substituted by a halogen atom other than a fluorine atom. The halogen atom other than a fluorine atom is preferably a chlorine atom.

The polyfluoroalkyl group is preferably a group wherein at least 60%, more preferably at least 80%, by number of hydrogen atoms in the corresponding alkyl group are substituted by fluorine atoms. A more preferred polyfluoroalkyl group is a perfluoroalkyl group.

In a case where $R^a$ has an ether bond, if the number of ether bonds is too large, the solubility will be impaired, and therefore, the number of ether bonds in $R^a$ is preferably from 1 to 3, more preferably from 1 to 2.

If the number of carbon atoms of $R^b$ is at least 6, the solubility of a polymer containing a fluorinated cyclic structure is significantly impaired. A preferred example of $R^b$ may, for example, be a methyl group, an ethyl group, a trifluoroethyl group, a tetrafluoroethyl group or a tetrafluoropropyl group.

The molecular weight of the fluorinated solvent is preferably at most 1,000, since if it is too large, not only the viscosity of the fluoropolymer composition is likely to increase but also the solubility of the polymer containing a fluorinated cyclic structure decreases. Further, the fluorine content of the fluorinated solvent is preferably from 60 to 80 wt % in order to increase the solubility of the polymer containing a fluorinated cyclic structure. As preferred fluorinated solvents, the following may be exemplified.

$F(CF_2)_4OCH_3$, $HCF_2CF_2OCH_2CF_3$, $HCF_2CF_2CH_2OCH_2CF_3$, $F(CF_2)_5OCH_3$, $F(CF_2)_6OCH_3$, $F(CF_2)_7OCH_3$, $F(CF_2)_8OCH_3$, $F(CF_2)_9OCH_3$, $F(CF_2)_{10}OCH_3$, $H(CF_2)_6OCH_3$, $(CF_3)_2CFCF(OCH_3)CF_2CF_3$, $F(CF_2)_3OCF(CF_3)CF_2OCH_3$, $F(CF_2)_3OCF(CF_3)CF_2OCF(CF_3)CF_2OCH_3$, $F(CF_2)_8OCH_2CH_3$, $(CF_3)_2CFCF_2CF_2OCH_3$, $F(CF_2)_2O(CF_2)_4OCH_2CH_3$.

Among such fluorinated solvents, particularly preferred is $(CF_3)_2CFCF(OCH_3)CF_2CF_3$.

The boiling point of the solvent is preferably from 65 to 220° C. When the boiling point of the fluorinated organic solvent is at least 100° C., it is possible to readily form a uniform film at the time of coating.

As a specific example of a coating fluid using the above solvent which can dissolve the "fluorinated cyclic polymer" and the "non-cyclic fluororesin", a perfluorotributylamine solution of a fluorinated cyclic polymer having reactive functional groups such as carboxy groups at main chain terminals, or a perfluorohexane solution of a fluoroolefin/vinyl ether copolymer having reactive functional groups such as carboxy groups at side chain terminals may, for example, be mentioned.

A solvent which can dissolve the above "cycloolefin polymer" is not particularly limited so long as it is one which can dissolve the above cycloolefin polymer and form a coating film having a desired thickness and uniformity by a desired coating method, and it may, for example, be a protic solvent or an aprotic solvent.

The protic solvent may, for example, be methanol, ethanol, 1-propanol, isopropyl alcohol, 1-butnaol, 2-butanol, t-butanol, pentanol, hexanol, 1-octanol, 2-octanol, ethylene glycol, ethylene glycol monomethyl ether, propylene glycol monomethyl ether, propylene glycol monobutyl ether, propylene glycol or methyl lactate. Among them, 1-propanol is preferred.

The aprotic solvent may, for example, be hexane, cycloehxane, heptane, octane, decane, dodecane, decalin, acetone, cyclohexanone, 2-butanone, dimethoxyethane, monomethyl ether, ethyl acetate, butyl acetate, diglyme, triglyme, propylene glycol monomethyl ether monoacetate (PGMEA), N,N-dimethylformamide (DMF), N,N-dimethylacetamide (DMA), N-methylpyrrolidone, tetrahydrofuran, anisole, dichloromethane, dichloroethane, chloroform, carbon tetrachloride, chlorobenzene, hexafluorometaxylene, fluorobenzene, difluorobenzene, hexafluorobenzene, dichlorobenzene, benzene, toluene, xylene, ethylbenzene, mesitylene, tetralin or methyl naphthalene. Among them, a hydrocarbon is preferred, an aromatic hydrocarbon such as benzene, toluene, xylene, ethylbenzene, mesitylene, tetralin or methyl naphthalene is more preferred, and toluene or xylene is furthermore preferred.

These solvents may be used alone or in combination as a mixture of two or more of them. Further, a wide range of compounds may be used other than these solvents.

A solvent which can dissolve the above compound (A) is preferably a protic fluorinated solvent in the case of mixing with the above "fluorinated cyclic polymer" or "non-cyclic fluororesin". Further, in the case of mixing with the above "cycloolefin polymer", the same solvent as the above-mentioned protic solvent or aprotic solvent may be used.

As the above protic fluorinated solvent, the following ones may be exemplified.

A fluorinated alcohol such as trifluoroethanol, 2,2,3,3,3-pentafluoro-1-propanol, 2-(perfluorobutyl)ethanol, 2-(perfluorohexyl)ethanol, 2-(perfluorooctyl)ethanol, 2-(perfluorodecyl)ethanol, 2-(perfluoro-3-methylbutyl)ethanol, 2,2,3,3-tetrafluoro-1-propanol, 2,2,3,3,4,4,5,5-octafluoro-1-pentanol, 2,2,3,3,4,4,5,5,6,6,7,7-dodecafluoro-1-heptanol, 2,2,3,3,4,4,5,5,6,6,7,7,8,8-hexadecafluoro-1-nonanol, 1,1,1,3,3,3-hexafluoro-2-propanol or 1,3,3,4,4-hexafluoro-2-butanol.

A fluorinated carboxylic acid such as trifluoroacetic acid, perfluoropropanoic acid, perfluorobutanoic acid, perfluoropentanoic acid, perfluorohexanoic acid, perfluoroheptanoic acid, perfluorooctanoic acid, perfluorononanoic acid, perfluorodecanoic acid, 1,1,2,2-tetrafluoropropanoic acid, 1,1,2,2,3,3,4,4-octafluoropentanoic acid, 1,1,2,2,3,3,4,4,5,5-dodecafluoroheptanoic acid or 1,1,2,2,3,3,4,4,5,5,6,6-hexadecafluorononanoic acid, amides of these fluorinated carboxylic acids, or a fluorinated sulfonic acid such as trifluoromethanesulfonic acid or heptadecafluorooctanesulfonic acid.

These protic fluorinated solvents may be used alone, or two or more of them may be used as a mixture.

The solid content concentration of the coating fluid may suitably be set depending upon the thickness of the film to be formed. It is usually from 0.1 to 30 mass %, preferably from 0.5 to 20 mass %.

In a case where the coating film is to be formed by a wet coating method, such film forming can be carried out by coating the surface of a substrate with the above coating fluid, followed by drying by e.g. baking.

As the coating method, a conventional method for forming a film from a solution may be employed without any particular limitation. Specific examples of such a method include a roll coater method, a casting method, a dipping method, a spin coating method, a casting-on-water method, a Langmuir•Blodgett method, a die coating method, an ink jet method and a spray coating method. Otherwise, it is possible to employ a printing technique such as a relief printing method, a gravure printing method, a lithography method, a screen printing method or a flexo printing method.

As a substrate to be coated with a coating fluid, it is possible to employ a substrate which can be connected to earth when electric charge is injected to the coating film obtained by coating, without selecting the material. As a preferred material, a conductive metal such as gold, platinum, copper, aluminum, chromium or nickel may be mentioned. Further, a material other than a conductive metal, such as a semiconductor material such as silicon, an inorganic material of e.g. glass or an insulating material such as an organic polymer material such as polyethylene terephthalate, polyimide, polycarbonate or an acrylic resin may also be used so long as it is one having its surface coated with a metal film by a method such as sputtering, vapor deposition or wet coating, or with a metal oxide conductive film such as ITO or IZO, or with an organic conductive film such as polyaniline, polypyrrole, PEDOT/PSS or carbon nanotube.

Such a substrate may be a flat plate having a smooth surface or one having convexoconcave formed thereon. Otherwise, it may have patterning applied in various shapes. Particularly in a case where the above-mentioned insulating substrate is employed, a pattern or convexoconcave may be formed on the insulating substrate itself, or a pattern or convexoconcave may be formed on a metal film coated on the surface.

As a method for forming a pattern or convexoconcave on the substrate, a conventional method may be employed without any particular restriction. As the method for forming a pattern or convexoconcave, either a vacuum process or a wet process may be employed. As specific examples of such a method, a vacuum process may, for example, be a sputtering method via a mask or a vapor deposition method via a mask, and a wet process may, for example, be a roll coater method, a casting method, a dipping method, a spin coating method, a casting-on-water method, a Langmuir•Blodgett method, a die coating method, an ink jet method or a spray coating method. Otherwise, it is possible to employ a printing technique such as a relief printing method, a gravure printing method, a lithography method, a screen printing method or a flexo printing method. Further, as a method for forming a fine pattern or convexoconcave, a nanoimprinting method or a photolithography method may, for example, be employed.

Further, the substrate may be removed after the electric charge is injected.

After the above coating fluid is applied, the solvent is preferably dried by e.g. baking. As the drying conditions, it is preferred to carry out drying at the boiling point of the solvent or higher.

The shape and size of a layer made of the above coating film may suitably be set depending upon the shape and size of the desired electret. An electret is usually employed in the form of a film having a thickness of from 1 to 200 μm. The electret is particularly preferably employed in the form of a film having a thickness of from 10 to 20 μm since such a thickness is advantageous for the properties and the processability of an electret.

In the present invention, as the case requires, on the above coating film, a layer other than the coating film may be laminated. As other layers capable of being laminated with the coating film, a protective layer, a layer made solely of the above polymer (B) and a layer made of an inorganic substance may, for example, be mentioned.

As a method for injecting electric charge to the above coating film, it is usually possible to employ any method so long as it is a method to charge an insulator. For example, it is possible to use a corona discharge method, an electron beam bombardment method, an ion beam bombardment method, a radiation method, a light radiation method, a contact charging method or a liquid contact charging method, as disclosed in G. M. Sessler, Electrets Third Edition, pp. 20, Chapter 2.2 "Charging and Polarizing Methods" (Laplacian Press, 1998). Especially, for the electret of the present invention, it is preferred to employ a corona discharge method or an electron beam bombardment method.

Further, as a temperature condition at the time of injecting electric charge, it is preferred to carry out the injection at a temperature of at least the glass transition temperature of an organic polymer from the viewpoint of the stability of electric charge maintained after the injection, and it is preferred to carry out the injection under a temperature condition of about the glass transition temperature +10 to 20° C. Further, the voltage to be applied at the time of injecting electric charge is preferably high so long as it is lower than the dielectric breakdown voltage of the composite material layer. In the composite material layer in the present invention, a high voltage of from ±6 to ±30 kV can be applied, and the voltage applied is particularly preferably from ±8 to ±15 kV. Especially, in a case where an organic polymer to be used for a composite material is a fluororesin, the composite material layer is capable of maintaining a negative electric charge more stably than a positive electric charge, and accordingly, it is further preferred to apply a voltage of from −8 to −15 kV.

The electret of the present invention is suitable as an electrostatic induction conversion device to convert electric energy to kinetic energy.

Such an electrostatic induction conversion device may, for example, be a vibration-type power-generating unit, an actuator or a sensor. The structure of such an electrostatic induction conversion device may be the same as a conventional one except that as the electret, the electret of the present invention is used.

As compared with conventional electrets, the electret of the present invention has high stability with time and thermal stability of retained electric charge and has excellent charge retention performance.

Therefore, the electrostatic induction conversion device of the present invention comprising the electret has such features that deterioration of properties is less likely to occur, and dependence of the properties on the environment is small.
<Operation Mechanism>

By using a composition comprising the compound (A) having a molecular weight of from 50 to 2,000 and having at least two polar functional groups, and the polymer (B) having a number average molecular weight of more than 2,000 and having reactive functional groups reactive with the above polar functional groups, the stability with time and the thermal stability of retained electric charge of an electret produced are improved.

As a reason as to why the stability with time and the thermal stability of the retained electric charge are improved by incorporating the compound (A) into the polymer (B), it is estimated that nano phase separation of the compound (A) occurs in the polymer (B), a nano cluster structure derived from the compound (A) is formed, and the nano cluster structure functions as a moiety to store electric charge in the electret.

The present inventors have found that in order to maximize the effect of the present invention, as the compound (A), a compound having a plurality of amino groups such as tris(2-aminoethyl)amine or tris(2-aminopropyl)amine is suitable, and as the polymer (B), a fluororesin having an alicyclic structure, and having reactive functional groups in its polymer terminals, is suitable. It is estimated that the nano cluster structure derived from the compound (A) is formed by a hydrogen bond to which an amino group and a reactive functional group of the polymer (B) relate. As the hydrogen bond, the following two types are considered.

(1) A hydrogen bond formed between an amino group of the compound (A) and the reactive functional group of the polymer (B)

(2) A hydrogen bond formed between the amino groups of the compound (A)

The nano cluster structure formed via the above-mentioned hydrogen bond contains an amino group, whereby it tends to positively be charged. Accordingly, it is estimated that the retained electric charge is stabilized by interaction at the time of shooting negative electric charge. Further, it is considered that the nano cluster structure also interacts with terminal groups of the polymer (B) via the above-mentioned hydrogen bond. Accordingly, it is estimated that the thermal motion of the nano cluster is suppressed, and the thermal stability of the retained electric charge is improved.

EXAMPLES

Now, specific cases of the above embodiment will be described as Examples. However, it should be understood that the present invention is by no means restricted to the following Examples.

In the following Examples, the volume resistivity is a value measured in accordance with ASTM D257.

The dielectric breakdown voltage is a value measured in accordance with ASTM D149.

The relative dielectric constant is a value measured in accordance with ASTM D150 at a frequency of 1 MHz.

The intrinsic viscosity [η] (30° C.) (unit: dl/g) is a value measured by an Ubbelohde viscometer at 30° C. by using perfluoro(2-butyltetrahydrofuran) as a solvent.

The number average molecular weight is a value measured as calculated as methyl polymethacrylate by gel permeation chromatography (GPC).

Further, in each of the following Examples, for the measurement of the thickness of each layer was carried out by using optical interfero type film thickness measuring apparatus C10178 manufactured by Hamamatsu Photonics K.K.

Preparation Example 1

Preparation of Polymer Solution P1

In perfluorotributylamine, polyperfluorobutenyl vinyl ether A was dissolved at a concentration of 15 mass % to obtain a polymer solution P1.

With respect to the polymer (polyperfluorobutenyl vinyl ether A) dissolved in this polymer solution P1, the infrared absorption spectrum of a compression-molded film of the polymer was measured, and as a result, the characteristic absorption was observed at 1,775 and 1,800 cm$^{-1}$ attributable to —COOH groups. The number average molecular weight of the polymer was 135,000. Further, the intrinsic viscosity [η] (30° C.) of the polymer was 0.23 dl/g. The volume resistivity was >10$^{17}$Ωcm, and the dielectric breakdown voltage was 19 kV/mm. The relative dielectric constant was 2.1.

Here, the polyperfluorobutenyl vinyl ether A is one prepared in such a manner that, in accordance with Synthesis Examples 2 to 4 in Examples of JP-A-4-189880, perfluorobutenyl vinyl ether (CF$_2$=CFOCF$_2$CF$_2$CF=CF$_2$) was subjected to cyclopolymerization with diisopropyl peroxydicarbonate (((CH$_3$)$_2$CHOCOO)$_2$) as a polymerization initiator, and a polymer thus obtained was subjected to heat treatment, and then its terminals were hydrolyzed to be —COOH.

Preparation Example 2

Preparation of Polymer Solution P2

In perfluorotributylamine, polyperfluorobutenyl vinyl ether E was dissolved at a concentration of 9 mass % to obtain a polymer solution P2.

With respect to the polymer (polyperfluorobutenyl vinyl ether E) dissolved in this polymer solution P2, the infrared absorption spectrum of a compression-molded film of the polymer was measured, and as a result, the characteristic absorption was observed at 1,795 cm$^{-1}$ attributable to —COOCH$_3$ groups. Further, the number average molecular weight of the polymer was 141,000. Further, the intrinsic viscosity [η] (30° C.) of the polymer was 0.25 dl/g. The volume resistivity was >10$^{17}$Ωcm, and the dielectric breakdown voltage was 19 kV/mm. The relative dielectric constant was 2.1.

Here, the polyperfluorobutenyl vinyl ether E is one prepared in such a manner that, in accordance with Synthesis Example 3 in Examples of JP-A-4-226177, perfluorobutenyl vinyl ether was subjected to cyclopolymerization with diisopropyl peroxydicarbonate as a polymerization initiator, and the terminals of a polymer thus obtained were esterified by using methanol to be —COOCH$_3$.

Preparation Example 3

Preparation of Polymer Solution P3

In perfluorotributylamine, polyperfluorobutenyl vinyl ether S was dissolved at a concentration of 9 mass % to obtain a polymer solution P3.

With respect to the polymer (polyperfluorobutenyl vinyl ether S) dissolved in the polymer solution P3, the infrared absorption spectrum of a compression-molded film of the polymer was measured, and as a result, the characteristic absorption attributable to carbonyl groups was not detected.

Further, the number average molecular weight of the polymer was 128,000. Further, the intrinsic viscosity [η] (30° C.) of the polymer was 022 dl/g. The volume resistivity was >10$^{17}$Ωcm, and the dielectric breakdown voltage was 19 kV/mm. The relative dielectric constant was 2.1.

Here, the polyperfluorobutenyl vinyl ether S is one prepared in such a manner that, in accordance with Examples of JP-A-4-189802, perfluorobutenyl vinyl ether was subjected to cyclopolymerization with diisopropyl peroxydicarbonate as a polymerization initiator, and unstable terminal groups derived from the initiator in the polymer thus obtained were fluorinated by using $F_2$ gas to remove the unstable terminal groups.

Example 1

Production of Electret A (1) To 442 g of the above polymer solution P1, 2.3 g of 2-(perfluorohexyl)ethanol and 3.5 g of perfluorotributylamine were added, and further 0.15 g of tris(2-aminoethyl)amine was added and mixed to obtain a uniform polymer solution A.

On a copper substrate of 3 cm×3 cm having a thickness of 350 μm, the polymer solution A was applied by a spin coating method and baked at 200° C. to obtain a coating film having a thickness of 15 μm (hereinafter referred to as a coating film A).

To the coating film A, electric charge was injected by corona discharge to obtain electret A. The injection of electric charge was carried out by using a corona charging equipment, of which a schematic construction diagram is shown in FIG. 1, by the following procedure under a condition of 160° C. at a charging voltage of −8 kV for a charging time of 3 minutes. That is, by using a copper substrate (10) as an electrode, a high voltage of −8 kV was applied between a corona needle (14) and the copper substrate (10), by a DC high voltage power source (12) (HAR-20R5, manufactured by Matsusada Precision Inc.) to inject electric charge to the coating film A (11) formed on the copper substrate (10). In this corona charging equipment, negative ions discharged from the corona needle (14) are homogenized by a grid (16), and then showered down on the coating film A (11), whereby electric charge is injected. Here, to the grid (16), a voltage of −600 V is applied from a power source (18) for grid.

(2) The above polymer solution A was cast on a PTFE sheet, and dried under conditions at 100° C. for 1 hour and at 200° C. for 1 hour, to prepare a cast film A having a thickness of about 100 μm. This cast film A was subjected to small-angle X-ray scattering measurement under conditions hereinbelow.

Example 2

Production of Electret A'

On a copper substrate of 3 cm×3 cm having a thickness of 350 μm, the above polymer solution A was applied by a spin coating method and baked at 230° C. to obtain a coating film having a thickness of 15 μm (hereinafter referred to as a coating film A'). To the coating film A', electric charge was injected by the same procedure as in Example 1 to product electret A'.

Example 3

Production of Electret B

To 40 g of the above polymer solution P2, 1.9 g of 2-(perfluorohexyl)ethanol was added, and further 0.09 g of tris(2-aminoethyl)amine was added and mixed to obtain a uniform polymer solution B.

On a copper substrate of 3 cm×3 cm having a thickness of 350 μm, the polymer solution B was applied by a spin coating method and baked at 200° C. to obtain a coating film having a thickness of 15 μm (hereinafter referred to as a coating film B).

To the coating film B, electric charge was injected by the same procedure as in Example 1 to produce electret B.

Example 4

Production of Electret C

To 44.2 g of the above polymer solution P1, 2.3 g of 2-(perfluorohexyl)ethanol and 3.5 g of perfluorotributylamine were added, and further 0.12 g of cyclohexane-1,3-diamine was added and mixed to obtain a uniform polymer solution C.

On a copper substrate of 3 cm×3 cm having a thickness of 350 μm, the polymer solution C was applied by a spin coating method and baked at 200° C. to obtain a coating film having a thickness of 15 μm (hereinafter referred to as a coating film C).

To the coating film C, electric charge was injected by the same procedure as in Example 1 to produce electret C.

Example 5

Production of Electret D

To 44.2 g of the above polymer solution P1, 2.3 g of 2-(perfluorohexyl)ethanol and 3.5 g of perfluorotributylamine were added, and further 0.12 g of hexane-1,6-diamine was added and mixed to obtain a uniform polymer solution D.

On a copper substrate of 3 cm×3 cm having a thickness of 350 μm, the polymer solution D was applied by a spin coating method and baked at 200° C. to obtain a coating film having a thickness of 15 μm (hereinafter referred to as a coating film D).

To the coating film D, electric charge was injected by the same procedure as in Example 1 to produce electret D.

Example 6

Production of Electret E

To 44.2 g of the above polymer solution P1, 2.3 g of 2-(perfluorohexyl)ethanol and 3.6 g of perfluorotributylamine were added, and further 0.08 g of polyethyleneimine (molecular weight: 1,800) was added and mixed to obtain a uniform polymer solution E.

On a copper substrate of 3 cm×3 cm having a thickness of 350 μm, the polymer solution E was applied by a spin coating method and baked at 200° C. to obtain a coating film having a thickness of 15 μm (hereinafter referred to as a coating film E).

To the coating film E, electric charge was injected by the same procedure as in Example 1 to produce electret E.

Comparative Example 1

Production of Electret F (1) On a copper substrate of 3 cm×3 cm having a thickness of 350 μm, the above polymer solution P1 was applied by a spin coating method and baked at 200° C. to obtain a coating film having a thickness of 15 μm (hereinafter referred to as a coating film F). To the coating film F, electric charge was injected by the same procedure as in Example 1 to produce electret F.

(2) The above polymer solution P1 was cast on a PTFE sheet, and dried under conditions at 100° C. for 1 hour and at 200° C. for 1 hour to prepare a cast film B having a thickness of about 100 µm. This cast film B was subjected to small-angle X-ray scattering measurement under conditions hereinbelow.

Comparative Example 2

Production of Electret G

To 44.2 g of the above polymer solution P1, 2.3 g of 2-(perfluorohexyl)ethanol and 3.5 g of perfluorotributylamine were added, and further 0.16 g of n-decylamine was added and mixed to obtain a uniform polymer solution G.

On a copper substrate of 3 cm×3 cm having a thickness of 350 µm, the polymer solution F was applied by a spin coating method and baked at 200° C. to obtain a coating film having a thickness of 15 µm (hereinafter referred to as a coating film G).

To the coating film F, electric charge was injected by the same procedure as in Example 1 to produce electret G.

Comparative Example 3

Production of Electret H

To 47.8 g of the above polymer solution P3, 2.4 g of 2-(perfluorohexyl)ethanol was added, and further 0.12 g of tris(2-aminoethyl)amine was added and mixed to obtain a uniform polymer solution H.

On a copper substrate of 3 cm×3 cm having a thickness of 350 µm, the polymer solution G was applied by a spin coating method and baked at 200° C. to obtain a coating film having a thickness of 15 µm (hereinafter referred to as a coating film H).

To the coating film H, electric charge was injected by the same procedure as in Example 1 to produce electret H.

Example 7

Production of Electret I

To 43.3 g of the above polymer solution P1, 2.6 g of 2-(perfluorohexyl)ethanol and 4.4 g of perfluorotributylamine were added, and further 0.22 g of tris(2-aminopropyl)amine was added and mixed to obtain a uniform polymer solution I.

On a copper substrate of 3 cm×3 cm having a thickness of 350 µm, the polymer solution I was applied by a spin coating method and baked at 200° C. to obtain a coating film having a thickness of 15 µm (hereinafter referred to as a coating film I).

To the coating film I, electric charge was injected by the same procedure as in Example 1 to produce electret I.

Example 8

Production of Electret

On a copper substrate of 3 cm×3 cm having a thickness of 350 µm, the above polymer solution I was applied by a spin coating method and baked at 230° C. to obtain a coating film having a thickness of 15 µm (hereinafter referred to as a coating film I').

To the coating film I', electric charge was injected by the same procedure as in Example 1 to produce electret I'.

Test Example 1

Charging Test

With respect to the electrets A to H obtained as described above, charging tests were carried out by the following procedure.

The electrets A to H immediately after injecting electric charge by corona charging under conditions of a charging voltage of −8 kV and a charging time of 3 minutes, were, respectively, returned to room temperature (25° C.), and their surface voltages (initial surface voltages) were measured. Further, the respective electrets were stored for 200 hours under conditions of 20° C. and 60% RH and then returned to room temperature, and their surface voltages (surface voltages after 200 hours) were measured.

Figure 2:
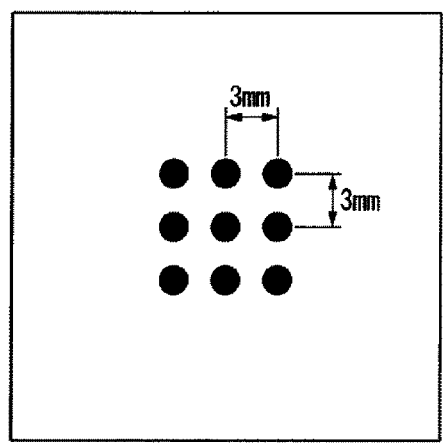
FIG. 2 is a diagram showing set positions for measuring points for surface voltages.

The surface voltage (V) was obtained by measuring surface voltages at 9 measuring points (set in a lattice arrangement for every 3 mm from the center of the film, as shown in FIG. 2) of each electret by using a surface voltmeter (model 279, manufactured by Monroe Electronics Inc.), and taking their average value.

Further, from the initial surface voltages and surface voltages after 200 hours, attenuation (%) of the surface voltage was determined by the formula: [(initial surface voltage−surface voltage after 200 hours)/initial surface voltage×100].

The results thereof are shown in Table 1.

Test Example 2

Thermal Stability Test

Figure 3:
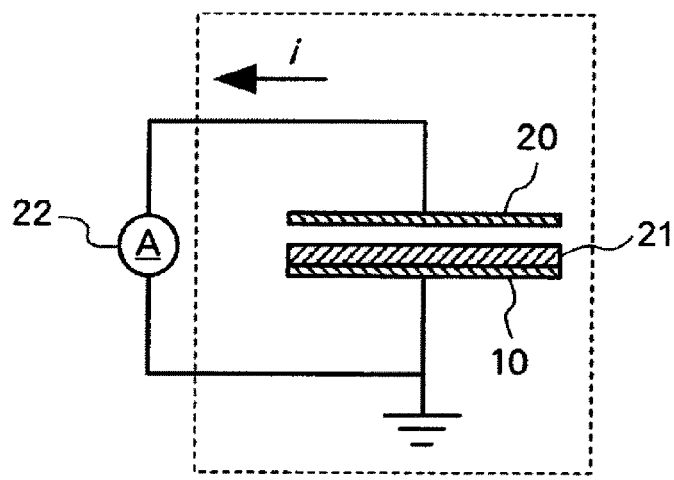
FIG. 3 is a schematic view illustrating an equipment used for a thermal stability test.

With regard to the above electrets A to H, thermal stability tests were carried out by the following procedure by using an equipment, of which a schematic diagram is shown in FIG. 3.

Firstly, as shown in FIG. 3, a counter electrode 20 was disposed to face an electret 21 (electrets A to H) on a substrate (copper substrate) 10.

Then, the temperature at the portion shown by dashed lines in FIG. 3 was raised at a constant rate (1° C./min) by heating by means of a heater, and the amount of electric charge discharged from each of electrets A to H was measured as a current value i flowing from the counter electrode 20 by ammeter 22 (a fine ammeter (model 6517A manufactured by Keithley)), and the discharge initiation temperature and the discharge peak temperature were obtained. The results are shown in Table 1.

Here, the discharge peak temperature represents a temperature at which the current value detected at the time of the discharge becomes maximum, and the discharge initiation temperature represents a temperature at the time when the current value obtained by the following formula (the current value at the initiation of the discharge) was detected by the ammeter 22.

Current value at the initiation of the discharge={(current value at the discharge peak temperature)−(current value before the discharge)}×0.1+(current value before the discharge)

The above thermal stability test is a method so-called a Thermal Stimulated Discharge method (hereinafter referred to as a TSD method). In this method, a capacitor will be formed by the electret 21 and the counter electrode 20. Accordingly, when the electret 21 is heated, the electric charge trapped in the film tends to be unstable, and if electric charge in the vicinity of the surface diminishes by e.g. diffusion, the electric charge stored in the counter electrode 20 will also decrease. Thus, by measuring the electric current value flowing from the counter electrode 20, the thermal stability of each of electrets A to H can be evaluated.

In the evaluation of the thermal stability by the TSD method, both of the discharge peak temperature and the discharge initiation temperature are important, but the discharge initiation temperature is particularly important. It is said that the higher these temperatures, the higher the thermal stability of the electret.

TABLE 1

|  | Ex. 1 | Ex. 2 | Ex. 3 | Ex. 4 | Ex. 5 | Ex. 6 |
|---|---|---|---|---|---|---|
| Electret | A | A' | B | C | D | E |
| Initial surface voltage (V) | −1361 | −1182 | −1201 | −1229 | −1121 | −924 |
| Surface voltage after 200 hours (V) | −1344 | −1153 | −1192 | −1223 | −1114 | −913 |
| Attenuation of surface voltage (%) | 1.25 | 2.45 | 0.75 | 0.49 | 0.62 | 1.19 |
| Discharge initiation temperature (° C.) | 167 | 174 | 150 | 132 | 126 | 152 |
| Discharge peak temperature (° C.) | 196 | 219 | 188 | 173 | 150 | 194 |

|  | Comp. Ex. 1 | Comp. Ex. 2 | Comp. Ex. 3 | Ex. 7 | Ex. 8 |
|---|---|---|---|---|---|
| Electret | F | G | H | I | I' |
| Initial surface voltage (V) | −803 | −1171 | −926 | −1065 | −1118 |
| Surface voltage after 200 hours (V) | −724 | −1165 | −688 | −1055 | −1107 |
| Attenuation of surface voltage (%) | 9.84 | 0.51 | 25.70 | 0.95 | 0.98 |
| Discharge initiation temperature (° C.) | 119 | 113 | 112 | 142 | 144 |
| Discharge peak temperature (° C.) | 148 | 144 | 184 | 175 | 183 |

From the results of the surface voltages at the initial stage and after 200 hours, and the attenuation shown in Table 1, it is found that as compared with the electrets F and H, the electrets A to E and I can stably maintain the injected electric charge over a long period of time. Further, from the result of the thermal stability test by the TSD method, it can be found that as compared with the electrets F, G and H in Comparative Examples, any of the electrets A to E and I has high discharge initiation temperature and excellent thermal stability in the electric charge injected. Further, the electret I in which the compound (A) is tris(2-aminopropyl)amine can stably maintain the injected electric charge over a long period of time, but as compared with the electret A in which the compound (A) is tris(2-aminoethyl)amine, the discharge initiation temperature was low. It is estimated that this is derived from the size of the compound (A).

Test Example 3

Small-Angle X-Ray Scattering Analysis

Figure 4:
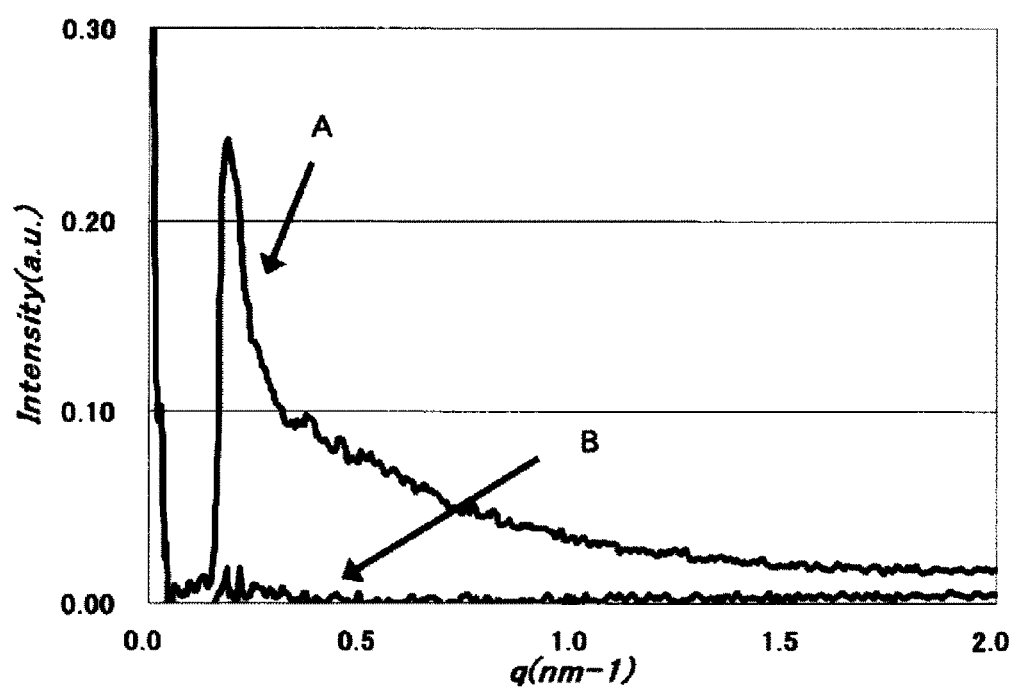
FIG. 4 is a graph showing a result of small-angle X-ray scattering of a cast film.

A small-angle X-ray scattering measurement was carried out by using the above-mentioned cast films A and B by Nano-viewer manufactured by Rigaku Corporation.
The measurement conditions were shown below.
X-ray wavelength: 0.154 nm (CuKα ray)
Length of camera: 500 mm
Detector: IP (imaging plate)
Measurement mode: transmission measurement
Measurement temperature: room temperature
Exposure time: 30 minutes
Optical type slit; 1st 0.4 mm, 2nd 0.3 mm, 3rd 0.5 mm
The result of a small-angle X-ray ray scattering measurement of a cast film was shown in FIG. 4. In FIG. 4, the vertical axis represents the intensity (optional unit) of X-ray scattering, and q of the horizontal axis represents a value of the following formula. In the following formula, λ is a wavelength, and θ is a scattering angle.

$$q=(4\pi/\lambda)\sin(\theta/2)$$

In FIG. 4, A and B respectively represent scattering spectra of the cast films A and B.

From this result, in the case of the cast film A using a polymer solution A having tris(2-aminoethyl)amine mixed therein, a scattering peak which was not observed in the cast film B using the polymer solution P1 in which no tris(2-aminoethyl)amine was added, was detected. This indicates that in a uniform film in a state where no tris(2-aminoethyl)amine is present, a non-uniform structure derived from tris(2-aminoethyl)amine is produced. It is estimated that in the cast film A, a non-uniform portion of a few ten nanometer-order size is present. From this result, it is estimated that a nano cluster is formed from tris(2-aminoethyl)amine in the fluoropolymer, and it is considered that this nano cluster works as an electric charge retaining portion of the electret, whereby the above-described stability with time and thermal stability of retained electric charge are improved.

INDUSTRIAL APPLICABILITY

The electret of the present invention is useful for an electrostatic induction conversion device such as a power-generating unit or a microphone.

The entire disclosure of Japanese Patent Application No. 2008-241074 filed on Sep. 19, 2008 including specification, claims, drawings and summary is incorporated herein by reference in its entirety.

REFERENCE OF SYMBOLS 10 substrate, 11 coating film, 12 DC high-voltage power source, 14 corona needle, 16 grid, 17 ammeter, 18 power source for grid, 19 hot plate, 20 counter electrode, 21 electret, 22 ammeter

What is claimed is:

1. An electret obtained from a composition comprising a compound (A) having a molecular weight of from 50 to 2000 and having at least two polar functional groups, and a polymer (B) having a number average molecular weight of more than 2000 and having reactive functional groups reactive with the above polar functional groups.

2. The electret according to claim 1, wherein the above compound (A) has, as the above polar functional groups, a monovalent polar functional group selected from the group consisting of a primary amino group, a hydroxy group, a thiol group, a sulfonic group, a phosphono group, a carboxy group, an alkoxy carbonyl group, an acid halide group, a formyl group, a hydroxyphenyl group, an isocyanate group and a cyano group, and/or a bivalent polar functional group selected from the group consisting of a secondary amino group, a carbonyloxy group and a carbonate group.

3. The electret according to claim 1, wherein one of the above polar functional group and the above reactive functional group is at least one member selected from the group consisting of a primary amino group, a hydroxy group, a thiol group, a hydroxyphenyl group and a secondary amino group, and the other is at least one member selected from the group consisting of a sulfonic group, a phosphono group, a carboxy group, an alkoxy carbonyl group, an acid halide group, a formyl group, a hydroxyphenyl group, an isocyanate group, a cyano group, a carbonyloxy group and a carbonate group.

4. The electret according to claim 1, wherein each of the above polar functional groups is at least one member selected from the group consisting of a primary amino group, a hydroxy group, a thiol group, a hydroxyphenyl group and a secondary amino group, and each of the above reactive functional groups is at least one member selected from the group consisting of a carboxy group, an alkoxy carbonyl group, an acid halide group and a carbonate group.

5. The electret according to claim 1, wherein the content of the above compound (A) in the above composition is from 0.05 to 10 mass % to the content of the above polymer (B).

6. The electret according to claim 1, wherein the above polymer (B) has a cyclic structure in its main chain.

7. The electret according to claim 6, wherein the above cyclic structure is an alicyclic structure.

8. The electret according to claim 1, wherein the above polymer (B) contains fluorine atoms.

9. The electret according to claim 1, wherein the above polymer (B) has a relative dielectric constant of from 1.8 to 8.0.

10. The electret according to claim 1, wherein the above polymer (B) has units formed by cyclopolymerization of a diene type fluorinated monomer.

11. The electret according to claim 1, wherein the above composition further contains a fluorinated organic solvent.

12. The electret according to claim 1, wherein the compound (A) is at least one member selected from the group consisting of tris(2-aminoethyl)amine, cyclohexane-1,3-diamine, hexane-1,6-diamine, diethylenetriamine and polyethyleneimine.

13. An electrostatic induction conversion device comprising the electret as defined in claim 1.

* * * * *